(12) United States Patent
Sugiura et al.

(10) Patent No.: US 12,366,549 B2
(45) Date of Patent: Jul. 22, 2025

(54) GAS SENSOR ELEMENT

(71) Applicant: DENSO CORPORATION, Kariya (JP)

(72) Inventors: Kei Sugiura, Kariya (JP); Makoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 345 days.

(21) Appl. No.: 17/880,995

(22) Filed: Aug. 4, 2022

(65) Prior Publication Data

US 2022/0373504 A1 Nov. 24, 2022

Related U.S. Application Data

(63) Continuation of application No. PCT/JP2021/002165, filed on Jan. 22, 2021.

(30) Foreign Application Priority Data

Feb. 5, 2020 (JP) ................................ 2020-018041

(51) Int. Cl.
*G01N 27/407* (2006.01)
*G01N 27/406* (2006.01)

(52) U.S. Cl.
CPC ..... *G01N 27/4071* (2013.01); *G01N 27/4067* (2013.01)

(58) Field of Classification Search
CPC ........... G01N 27/4071; G01N 27/4067; G01N 27/4077
See application file for complete search history.

(56) References Cited

U.S. PATENT DOCUMENTS 6,340,419 B1 1/2002 Nakae et al.
2003/0188968 A1* 10/2003 Naito ................. G01N 27/4071
204/426

(Continued)

FOREIGN PATENT DOCUMENTS

JP 2010-261727 11/2010
JP 2010261727 A * 11/2010

(Continued)

OTHER PUBLICATIONS

Murai, English translation of JP-2010261727-A, 2010 (Year: 2010).*

(Continued)

*Primary Examiner* — Luan V Van
*Assistant Examiner* — Kaylee Tseng
(74) *Attorney, Agent, or Firm* — Nixon & Vanderhye P.C.

(57) ABSTRACT

A laminated gas sensor element is provided by laminating a plurality of ceramic layers. The gas sensor element includes: a solid electrolyte body having oxygen ion conductivity; a measurement electrode provided on a first principal surface of the solid electrolyte body; a reference electrode provided on a second principal surface of the solid electrolyte body; a chamber facing the measurement electrode and into which a measured gas is introduced; and a heater heating the solid electrolyte body. The chamber comprises at least one projecting corner portion, the at least one projecting corner portion projecting, on a cross section perpendicular to a longitudinal direction of the gas sensor element, in a width direction perpendicular to both of the longitudinal direction and a laminating direction. A tip of the projecting corner portion is disposed on a side closer to the heater than a center of the chamber in the laminating direction is.

7 Claims, 19 Drawing Sheets

(56) References Cited

U.S. PATENT DOCUMENTS

| | | | |
|---|---|---|---|
| 2005/0274615 A1 | 12/2005 | Naito et al. | |
| 2006/0151466 A1* | 7/2006 | Diehl | C04B 37/005 219/448.11 |
| 2007/0214865 A1* | 9/2007 | Nakae | C04B 37/005 73/19.01 |
| 2020/0057018 A1 | 2/2020 | Kamiya et al. | |

FOREIGN PATENT DOCUMENTS

| | | | | |
|---|---|---|---|---|
| JP | 2012-247390 | | 12/2012 | |
| JP | 2012247390 A | * | 12/2012 | |
| JP | 2018185234 A | * | 11/2018 | G01N 27/4072 |

OTHER PUBLICATIONS

Kamiya et al., English translation of JP-2018185234-A, 2018 (Year: 2018).*

Fujii et al., English translation of JP-2012247390-A, 2012 (Year: 2012).*

\* cited by examiner

GAS SENSOR ELEMENT

CROSS-REFERENCE TO RELATED APPLICATION

The present application is a continuation application of International Application No. PCT/JP2021/002165, filed on Jan. 22, 2021, which claims priority to Japanese Patent Application No. 2020-018041, filed on Feb. 5, 2020. The contents of these applications are incorporated herein by reference in their entirety.

BACKGROUND

Technical Field

The present disclosure relates to a laminated gas sensor element.

Background Art

An example of a laminated gas sensor element provided by laminating a plurality of ceramic layers, which includes a chamber into which a measured gas is to be introduced, is disclosed.

SUMMARY

In the present disclosure, provided is a gas sensor element as the following.

The gas sensor element, which is a laminated gas sensor element, including: a solid electrolyte body; a measurement electrode; a reference electrode; a chamber facing the measurement electrode and into which a measured gas is to be introduced; and a heater configured to heat the solid electrolyte body, wherein the chamber comprises at least one projecting corner portion, the at least one projecting corner portion projecting, on a cross section perpendicular to a longitudinal direction of the gas sensor element, in a width direction perpendicular to both of the longitudinal direction and a laminating direction, a tip of the projecting corner portion is disposed on a side closer to the heater than a center of the chamber in the laminating direction is, the gas sensor element comprises a duct facing the reference electrode and into which a reference gas is to be introduced, the heater is provided on an opposite side to the solid electrolyte body with the duct in between in the laminating direction, the chamber has a larger dimension in the width direction than the duct, and a width Wc of the chamber and a width Wd of the duct satisfy $1<Wc/Wd\leq1.73$.

BRIEF DESCRIPTION OF THE DRAWINGS

The above-described object and other objects, features, and advantages of the present disclosure will be further clarified by the following detailed description with reference to the attached drawings. The drawings are as follows.

DETAILED DESCRIPTION OF THE PREFERRED EMBODIMENTS

[PTL 1] JP 2010-261727 A

In the gas sensor element disclosed in PTL 1, projecting corner portions are formed at opposite ends in a width direction of the chamber. A temperature variation occurs in a laminating direction, for example, while the temperature is being raised with a heater, depending on a structure of the gas sensor element. In a case where such a temperature variation noticeably occurs, it is of concern that a tensile stress attributed to the temperature variation acts on a ceramic layer adjacent to the corner portion of the chamber, causing cracking of the element.

The present disclosure is intended to provide a gas sensor element capable of being effectively prevented from cracking of the element.

An aspect of the present disclosure is A gas sensor element, which is a laminated gas sensor element provided by laminating a plurality of ceramic layers, the gas sensor element comprising: a solid electrolyte body having an oxygen ion conductivity; a measurement electrode provided on a first principal surface of the solid electrolyte body; a reference electrode provided on a second principal surface of the solid electrolyte body; a chamber facing the measurement electrode and into which a measured gas is to be introduced; and a heater configured to heat the solid electrolyte body, wherein, the chamber comprises at least one projecting corner portion, the at least one projecting corner portion projecting, on a cross section perpendicular to a longitudinal direction of the gas sensor element, in a width direction perpendicular to both of the longitudinal direction and a laminating direction, a tip of the projecting corner portion is disposed on a side closer to the heater than a center of the chamber in the laminating direction is, the gas sensor element comprises a duct facing the reference electrode and into which a reference gas is to be introduced, the heater is provided on an opposite side to the solid electrolyte body with the duct in between in the laminating direction, the chamber has a larger dimension in the width direction than the duct, and a width Wc of the chamber and a width Wd of the duct satisfy 1<Wc/Wd≤1.73.

In the above-described gas sensor element, the tip of the projecting corner portion is located on the side closer to the heater than the center of the chamber in the laminating direction is. This makes it possible to reduce a tensile stress acting on a ceramic layer adjacent to the tip of the projecting corner portion due to a temperature variation occurring during heating with the heater. As a result, cracking of the element can be effectively prevented.

As described above, according to the above-described aspect, it is possible to provide a gas sensor element capable of being effectively prevented from cracking of the element.

First Embodiment

Description will be made on an embodiment of a gas sensor element with reference to FIG. 1 to FIG. 13.

Figure 1:
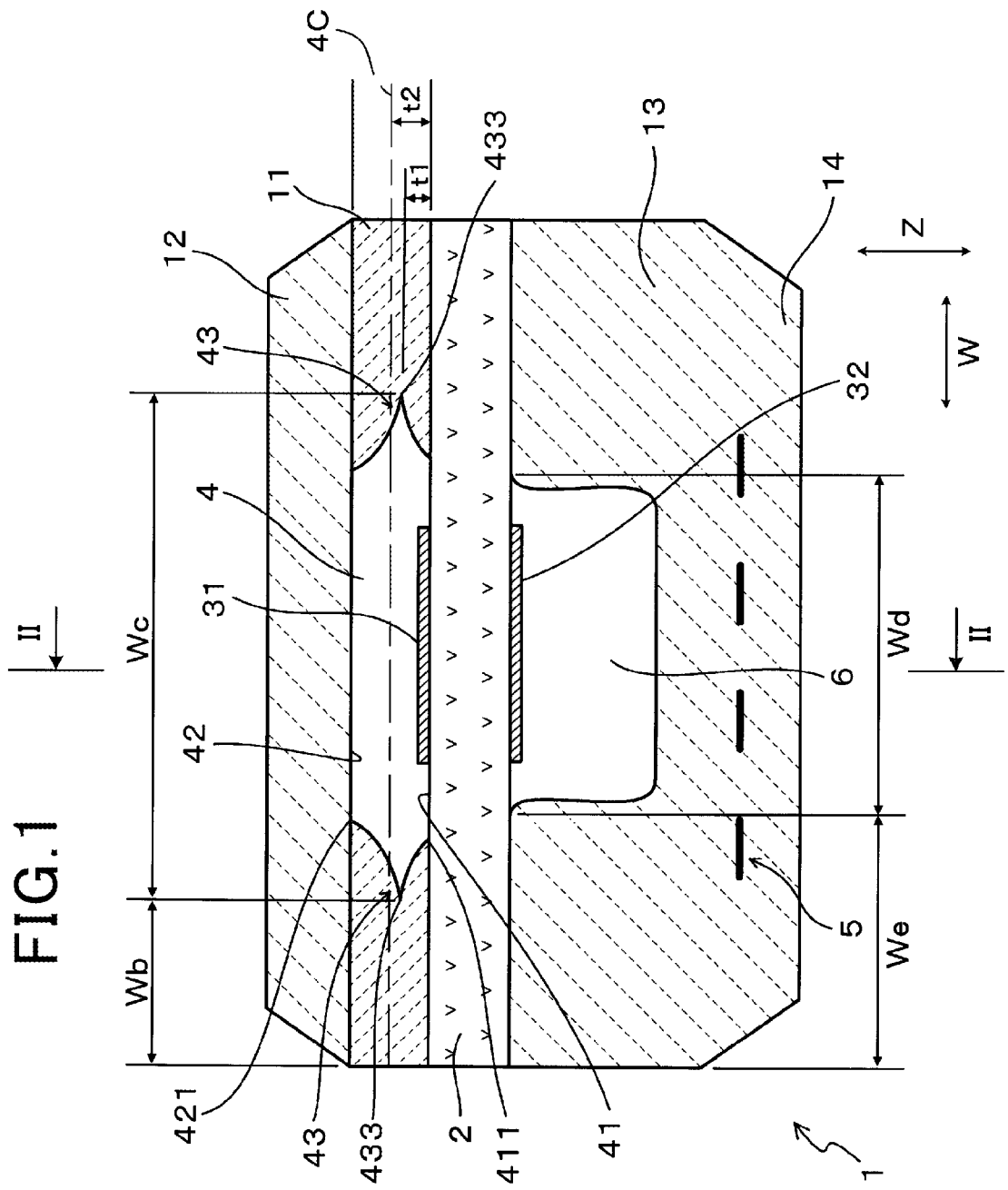
FIG. 1 is a cross-sectional illustration of a cross section perpendicular to a longitudinal direction of a gas sensor element according to a first embodiment.
Figure 2:
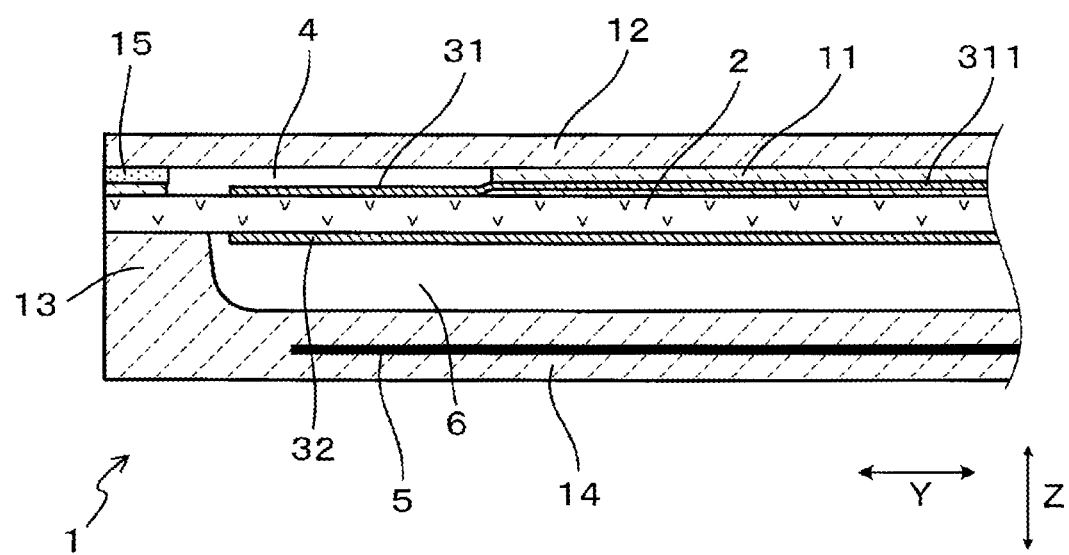
FIG. 2 is a cross-sectional view taken along a line II-II in FIG. 1 and seen from an arrow.

A gas sensor element 1 of the present embodiment is a laminated gas sensor element provided by laminating a plurality of ceramic layers as illustrated in FIG. 1 and FIG. 2. The gas sensor element 1 includes a solid electrolyte body 2, a measurement electrode 31 and a reference electrode 32, a chamber 4, and a heater 5.

The solid electrolyte body 2 has oxygen ion conductivity. The measurement electrode 31 is provided on a first principal surface of the solid electrolyte body 2, and the reference electrode 32 is provided on a second principal surface of the solid electrolyte body 2. The chamber 4 is a space facing the measurement electrode 31 and into which a measured gas is to be introduced. The heater 5 heats the solid electrolyte body 2.

The chamber 4 has a projecting corner portion 43. The projecting corner portion 43 is a portion projecting in a width direction W, on a cross-section perpendicular to a longitudinal direction Y of the gas sensor element 1. Here, the width direction W is a direction perpendicular to both the longitudinal direction Y and a laminating direction Z. A tip 433 of the projecting corner portion 43 is located on a side closer to the heater 5 than a center 4C of the chamber 4 in the laminating direction Z is.

The measurement electrode 31 and the reference electrode 32 are formed at positions close to an end of the gas sensor element 1 in the longitudinal direction Y, which is in an elongated shape. A side in the longitudinal direction Y where the measurement electrode 31 and the reference electrode 32 are provided is referred to as a distal end side and the opposite side is referred to as base end side.

The tip 433 of the projecting corner portion 43 is located on a side closer to the heater 5 than the center 4C of the chamber 4 in the laminating direction Z is at any position in the longitudinal direction Y.

The gas sensor element 1 of the present embodiment includes a duct 6. The duct 6 is a space facing the reference electrode 32 and into which a reference gas is to be introduced. The heater 5 is located opposite the solid electrolyte body 2 with the duct 6 in between in the laminating direction Z. The chamber 4 is larger in dimension in the width direction W than the duct 6. In addition, a width Wc of the chamber 4 and a width Wd of the duct 6 satisfy a relationship 1<Wc/Wd≤1.73.

It should be noted that the width Wc of the chamber 4 can be defined by a width dimension of a portion where a dimension in the width direction W reaches a maximum. In other words, a distance between the tips 433 of the projecting corner portions 43 on both sides in the width direction W corresponds to the width Wc. Likewise, the width Wd of the duct 6 can be defined by a width dimension of a portion where a dimension in the width direction W reaches a maximum. In the gas sensor element 1 illustrated in FIG. 1, the duct 6 has a maximum width at a portion facing the solid electrolyte body 2. In this case, the width Wd of the duct 6 is defined by a width dimension of the portion facing the solid electrolyte body 2.

In the gas sensor element 1 of the present embodiment, a chamber formation layer 11 and a shielding layer 12 are sequentially laminated on a surface of the solid electrolyte body 2 provided with the measurement electrode 31. In addition, a duct formation layer 13 and a heater layer 14 are sequentially laminated on a surface of the solid electrolyte body 2 provided with the reference electrode 32.

Figure 3:
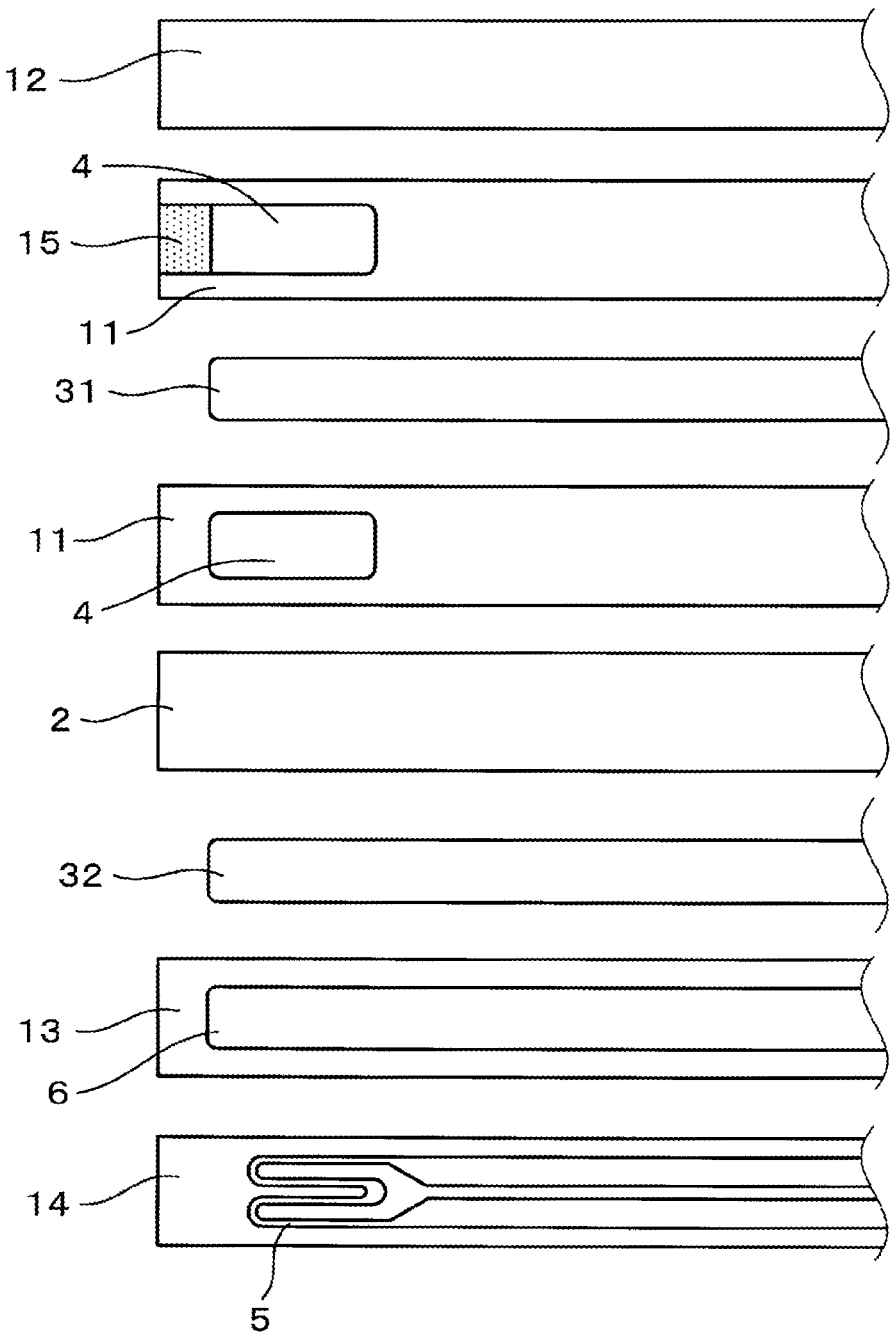
FIG. 3 is a development illustration of the gas sensor element according to the first embodiment.

The chamber formation layer 11 is a ceramic layer formed surrounding the chamber 4 from a direction perpendicular to the laminating direction Z as illustrated in FIG. 1 to FIG. 3. The chamber 4 is defined by the chamber formation layer 11, the solid electrolyte body 2, and the shielding layer 12. It should be noted that a part of the chamber formation layer 11 is provided with a diffusion resistor 15 as illustrated in FIG. 2 and FIG. 3. The diffusion resistor 15 is a portion through which the measured gas is to be introduced into the chamber 4 while being diffused. In addition, the chamber formation layer 11 is illustrated as being divided into two in FIG. 3; these correspond one-to-one to later-described individual ceramic pastes. In addition, the two portions referred to by using a reference sign '4' in FIG. 3 refer to portions that form the single chamber 4 with the plurality of ceramic layers laminated.

In the present embodiment, the diffusion resistor 15 is formed at a distal end portion of the gas sensor element 1. In other words, the diffusion resistor 15 is located on a distal end side of the chamber 4. The diffusion resistor 15 is comprised of porous ceramics. The gas sensor element 1 of the present embodiment is thus configured to allow the measured gas to be introduced into the chamber 4 through the distal end side of the device.

The duct formation layer 13 is a ceramic layer formed such that it covers the duct 6 from the opposite side to the solid electrolyte body 2 and surrounds the duct 6 from the direction perpendicular to the laminating direction Z as illustrated in FIG. 1 to FIG. 3. However, the duct formation layer 13 does not close a base end side of the duct 6. In other words, the duct 6 is open at a base end portion of the gas sensor element 1. This allows the reference gas to be introduced into the duct 6 from the base end side of the gas sensor element 1. In the present embodiment, the reference gas is the atmosphere.

The solid electrolyte body 2 is a ceramic layer consisting mainly of zirconia. The chamber formation layer 11, the shielding layer 12, the duct formation layer 13, and the heater layer 14 are each a ceramic layer consisting mainly of alumina. The diffusion resistor 15 also consists mainly of alumina. However, it is in the form of a porous ceramic body to let the measured gas flow therethrough.

The gas sensor element 1, which is provided by laminating the plurality of laminated ceramic layers, may have no boundary existing between the ceramic layers when in a finished state. For example, no boundary between the chamber formation layer 11 and the shielding layer 12 and no boundary between the duct formation layer 13 and the heater layer 14 may exist.

A width Wb of the chamber formation layer 11 outside the chamber 4 on the cross section perpendicular to the longitudinal direction Y is smaller than the width Wc of the chamber 4 as illustrated in FIG. 1. In addition, the width Wb of the chamber formation layer 11 is smaller than a width Wc of the duct formation layer 13 outside the duct 6.

The projecting corner portions 43 of the chamber 4 are formed to face the same material on both sides in the laminating direction Z. In other words, the projecting corner portions 43 face materials that are the same in composition consisting mainly of alumina on both sides in the laminating direction Z in the present embodiment. Each of the tips 433 of the projecting corner portions exists not at an interface between different materials but in the chamber formation layer 11 comprised of the same material. In addition, a portion of the chamber formation layer 11 adjacent to each of the projecting corner portions 43 is substantially homogeneous.

The chamber 4 has a first surface 41 and a second surface 42 facing in the laminating direction Z. The first surface 41 is a surface close to the heater 5 in the laminating direction Z. The second surface 42 is a surface far from the heater 5 in the laminating direction Z. In the present embodiment, the first surface 41 faces the solid electrolyte body 2. The second surface 42 faces the shielding layer 12. It should be noted that a dimension in the laminating direction Z between the first surface 41 and the tips 433 of the projecting corner portions 43 is referred to as "corner portion height t1" for convenience. In addition, a dimension in the laminating direction Z between the first surface 41 and the center 4C of the chamber 4 is referred to as "center height t2" for convenience. Here, t1<t2.

The first surface 41 and the second surface 42 may be substantially the same in width. However, the width of the first surface 41 may be larger than the width of the second surface 42. Alternatively, the width of the first surface 41 may be smaller than the width of the second surface 42.

Figure 4:
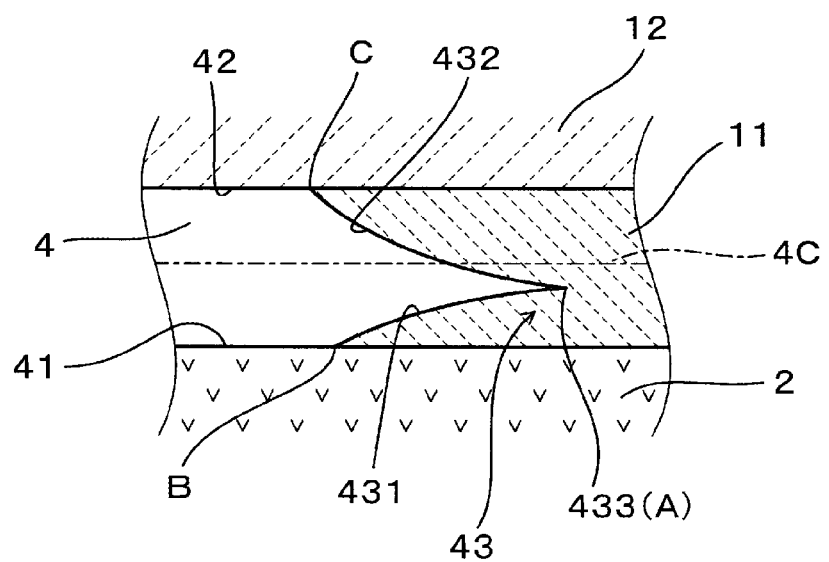
FIG. 4 is a cross-sectional illustration of a projecting corner portion according to the first embodiment.

The chamber 4 is provided with the projecting corner portions 43 such that they project outward from respective both ends in the width direction W of the first surface 41 and the second surface 42. The projecting corner portions 43 are each formed by two protruding curve surfaces 431 and 432, which are curve surfaces protruding toward the chamber 4, as illustrated in FIG. 4. The protruding curve surface 431 is a curve surface from the tip 433 of the projecting corner portion 43 to the first surface 41 on the cross section perpendicular to the longitudinal direction Y. The protruding curve surface 432 is a curve surface from the tip 433 of the projecting corner portion 43 to the second surface 42 on the cross section perpendicular to the longitudinal direction Y.

Figure 5:
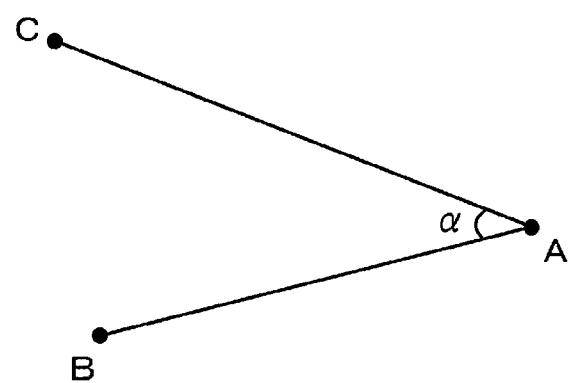
FIG. 5 is an illustration of an angle α of the projecting corner portion according to the first embodiment.

On the cross section perpendicular to the longitudinal direction Y, an angle α of at least one of the projecting corner portions 43 is an acute angle, that is, less than 90°. In addition, the angle α of at least one of the projecting corner portions 43 is equal to or less than 30°. In the present embodiment, the angle α of each of the projecting corner portions 43 on both sides in the width direction W is equal to or less than 30° in the present embodiment. The angle α of the projecting corner portions 43 is defined as follows: the angle α is provided by an angle CAB as illustrated in FIG. 5, where on the cross section perpendicular to in the longitudinal direction Y, a point A represents the tip 433 of each of the projecting corner portions 43, a point B represents one end of the first surface 41 near the projecting corner portion 43, and a point C represents one end of the second surface 42 near the projecting corner portion 43.

In addition, shapes of the projecting corner portions 43 formed on both sides in the width direction of the chamber 4 are substantially line-symmetric with respect to each other. However, the shapes of the projecting corner portions 43 formed on both sides in the width direction of the chamber 4 may be shapes asymmetric with respect to each other. Alternatively, the chamber 4 may be provided with the projecting corner portion 43 only on either side thereof in the width direction W.

Next, description will be made on an example of a method of manufacturing the gas sensor element 1 mainly with reference to FIG. 6 to FIG. 12.

Figure 6:
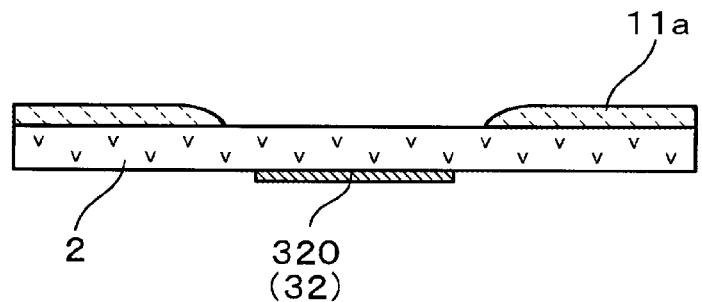
FIG. 6 is an illustration of a method of manufacturing the gas sensor element according to the first embodiment, illustrating a state where a ceramic paste is applied to a solid electrolyte body.

First, a ceramic paste 11a, which serves as a part of the chamber formation layer 11, is applied to one surface of the solid electrolyte body 2 in an unfired state as illustrated in FIG. 6. Here, the ceramic paste 11a is applied to, within the surface of the solid electrolyte body 2, a region except a portion that serves as the first surface 41 of the chamber 4. It should be noted that FIG. 6 illustrates a state where an electrically conductive paste 320, which serves as the reference electrode 32, is printed on the other surface of the solid electrolyte body 2 at this stage.

Figure 7:
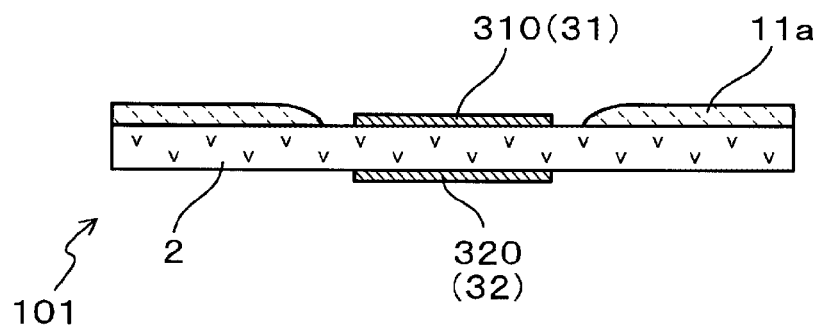
FIG. 7 is an illustration of a first unburnt body according to the first embodiment.

Next, an electrically conductive paste 310, which serves as the measurement electrode 31, is printed on the surface of the solid electrolyte body 2 where the ceramic paste 11a is applied as illustrated in FIG. 7. The electrically conductive paste 310 is also formed continuously on a part of a surface of the ceramic paste 11a applied to the solid electrolyte body 2 (not illustrated). The electrically conductive paste 310 at this part serves as a lead 311 as illustrated in FIG. 2. A first unfired body 101 is obtained in the above-described manner.

Figure 8:
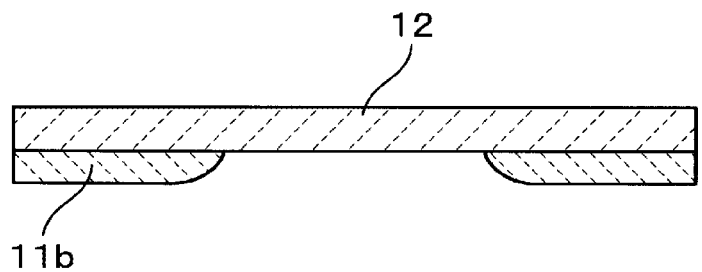
FIG. 8 is an illustration illustrating a state where a ceramic paste is applied to a shielding layer according to the first embodiment.

In addition, a ceramic paste 11b, which serves as another part of the chamber formation layer 11, is applied to one surface of the shielding layer 12 in an unfired state as illustrated in FIG. 8. Here, the ceramic paste 11b is applied to, within the surface of the solid electrolyte body 2, a region except a portion that serves as the second surface 42 of the chamber 4.

Figure 9:
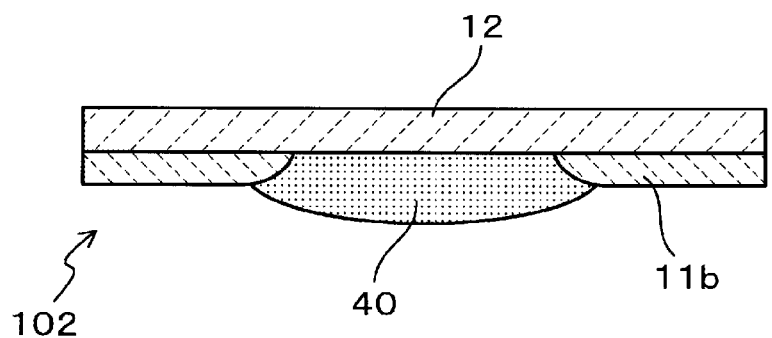
FIG. 9 is an illustration of a second unfired body according to the first embodiment.

Subsequently, a material to be burnt out 40 is applied to cover, within the surface of the solid electrolyte body 2, a portion that serves as the second surface 42 of the chamber 4 as illustrated in FIG. 9. The material to be burnt out 40 is applied such that it overlaps a part of the ceramic paste 11b. A second unfired body 102 is obtained in the above-described manner. The material to be burnt out 40 may be, for example, a paste including a carbon powder. A substance that is burnt out during a firing process later is usable as the material to be burnt out 40.

Figure 10:
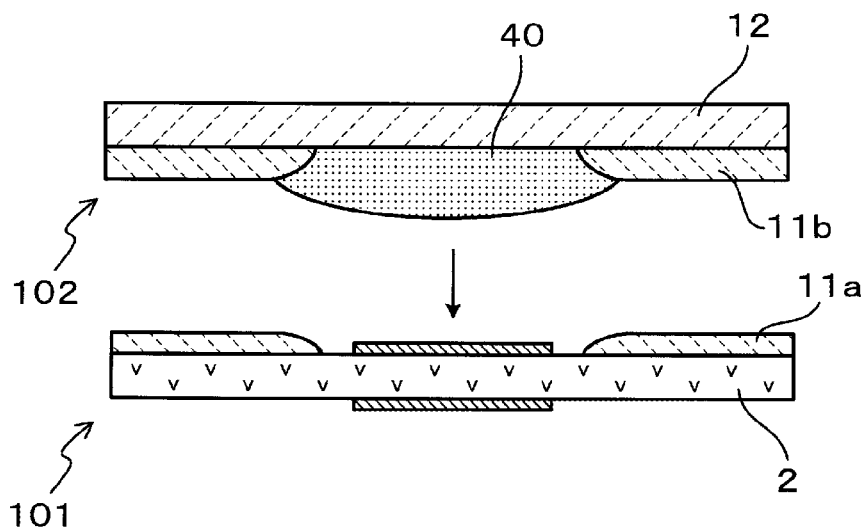
FIG. 10 is an illustration illustrating a state where the first unfired body and the second unfired body are opposed to each other according to the first embodiment.
Figure 11:
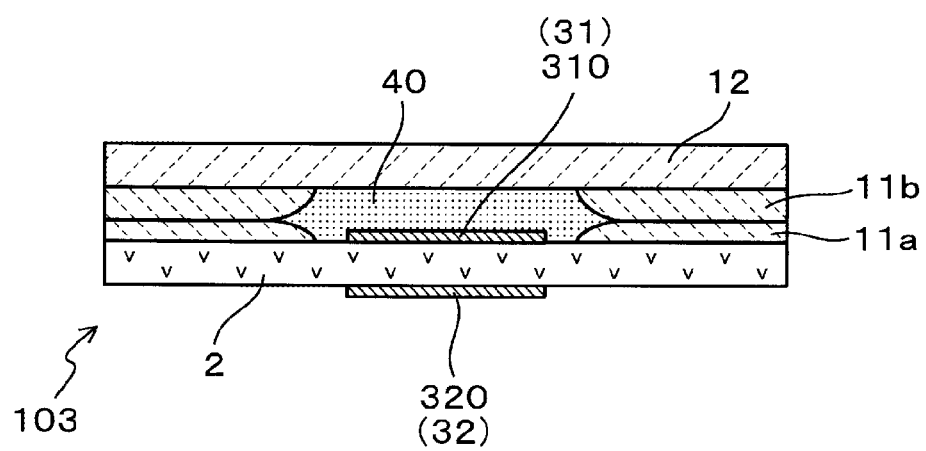
FIG. 11 is an illustration of a third unfired body according to the first embodiment.

Subsequently, the first unfired body 101 and the second unfired body 102 are opposed to each other such that the ceramic paste 11a and the ceramic paste 11b are opposed to each other as illustrated in FIG. 10. Then, the first unfired body 101 and the second unfired body 102 in this arrangement are laminated on each other and pressure-bonded, thereby obtaining a third unfired body 103 as illustrated in FIG. 11. In the third unfired body 103, a space that serves as the chamber 4 is filled with the material to be burnt out 40.

In addition, the unburnt duct formation layer 13 and the unburnt heater layer 14, which are laminated and pressure-bonded, are bonded to the third unfired body 103, although not illustrated. It should be noted that the heater layer 14 includes a ceramic sheet consisting mainly of alumina and that has one surface on which an electrically conductive paste, which serves as the heater 5 and a lead 51 connected thereto, is printed (see FIG. 3).

Figure 12:
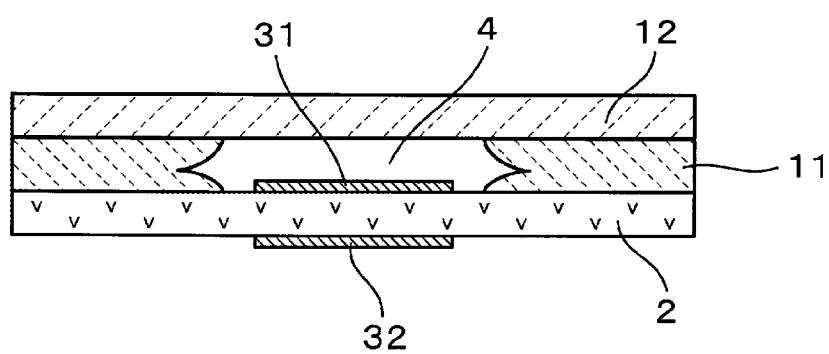
FIG. 12 is an illustration illustrating a state reached after firing the third unfired body according to the first embodiment.

Subsequently, the third unfired body 103 is fired to obtain the gas sensor element 1. At this time, the material to be burnt out 40 is burnt out to form the chamber 4 as illustrated in FIG. 12.

The gas sensor element 1 as illustrated in FIG. 1 and FIG. 2 is obtained in the above-described manner.

Figure 13:
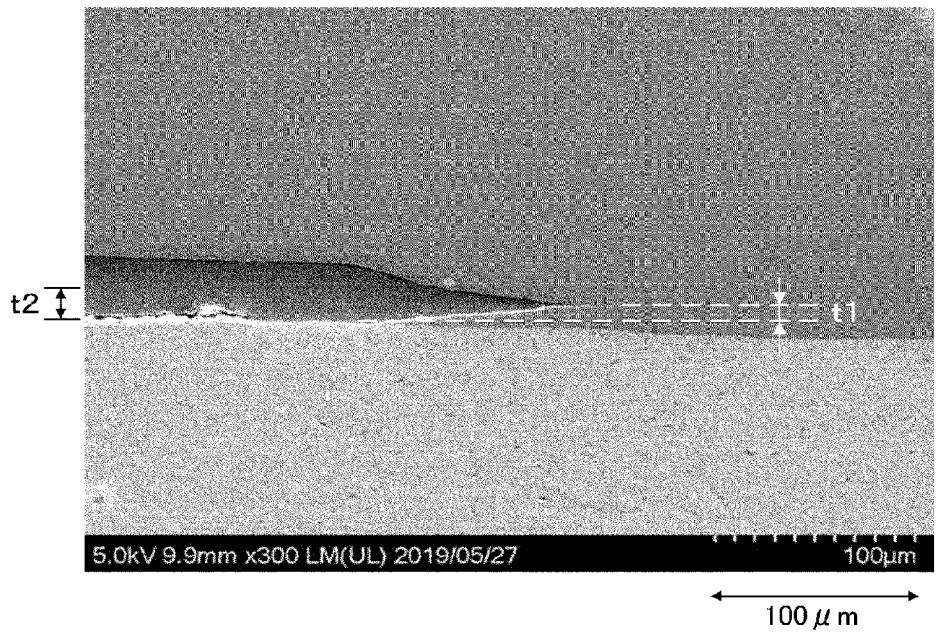
FIG. 13 is an enlarged photograph of a cross section of a vicinity of the projecting corner portion according to the first embodiment.

It should be noted that FIG. 13 is a photograph of a cross section of a part of the gas sensor element 1 actually manufactured. The photograph of the cross section is a photograph of a portion substantially corresponding to a cross section of a portion illustrated in FIG. 4. In FIG. 13, the corner portion height t1 and the center height t2 are added.

The gas sensor element 1 of the present embodiment may serve as, for example, a so-called A/F sensor element (i.e., an air-fuel ratio sensor element) attachable to an exhaust system of an automobile engine. Then, the gas sensor element 1 may detect an air-fuel ratio by measuring a concentration of a specific gas, i.e., oxygen, in the measured gas, i.e., an exhaust gas.

Next, description will be made on workings and effects of the present embodiment.

In the above-described gas sensor element 1, the tips 433 of the projecting corner portions 43 are located on a side closer to the heater 5 than the center 4C of the chamber 4 in the laminating direction Z is. This makes it possible to reduce a tensile stress acting on the ceramic layer adjacent to the tips 433 of the projecting corner portions 43 due to a temperature variation occurring during heating with the heater 5. As a result, cracking of the element can be effectively prevented.

Figure 14:
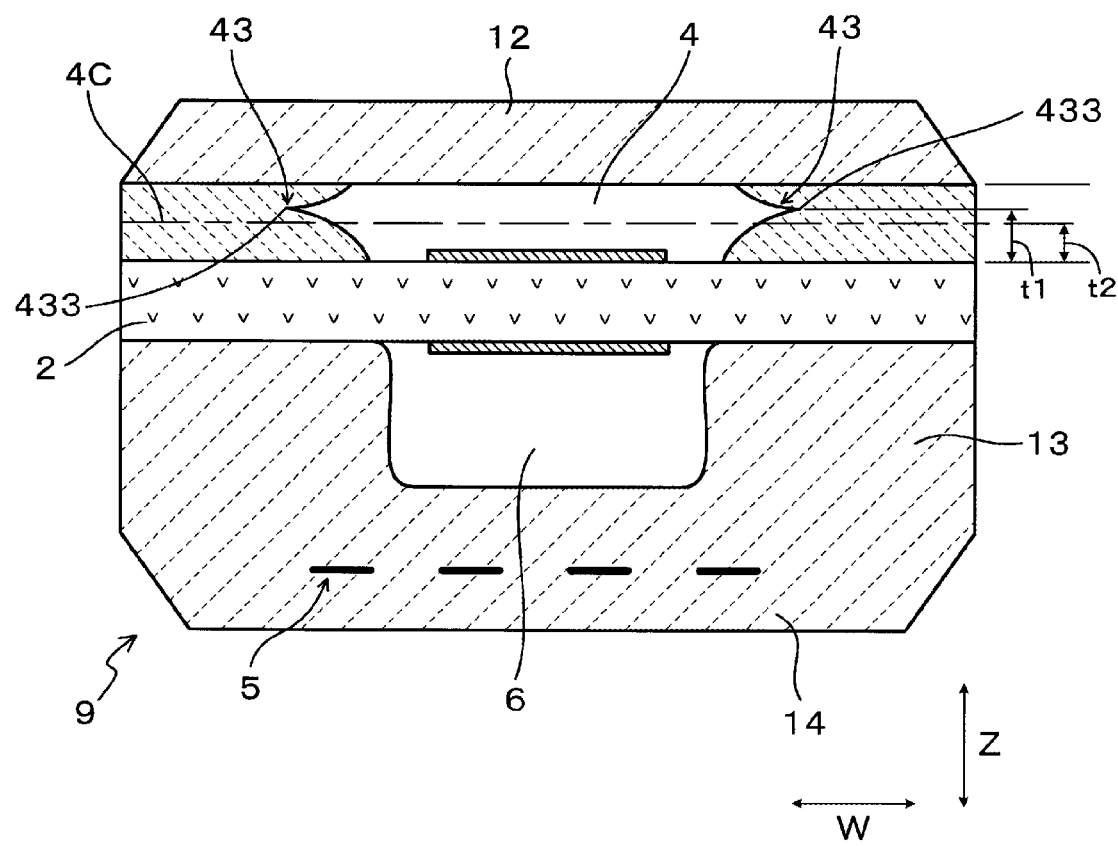
FIG. 14 is a cross-sectional illustration of a gas sensor element according to a comparative embodiment.

Description will be made on this point by comparison with a gas sensor element 9 of a comparative embodiment illustrated in FIG. 14. The gas sensor element 9 of the comparative embodiment illustrated in FIG. 14 is different from the gas sensor element 1 of the first embodiment in that the tips 433 of the projecting corner portions 43 of the chamber 4 are at positions farther from the heater 5 than the center 4C of the chamber 4 is. Except for that, it is similar to the gas sensor element 1 of the first embodiment.

Figure 15:
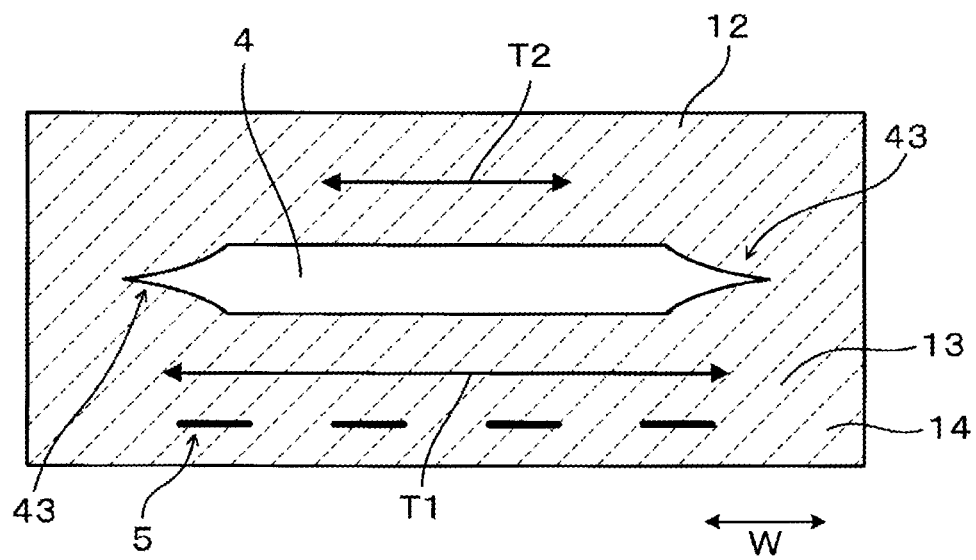
FIG. 15 is a schematic diagram illustrating thermal expansion during a rise in temperature of the gas sensor element.

A portion of the gas sensor element 1 close to the heater 5 is more likely to be heated to a high temperature than a portion far from the heater 5 during heating with the heater 5. Thus, the heater layer 14 and the duct formation layer 13 are more likely to be heated to a high temperature than the shielding layer 12. This results in occurrence of a larger expansion T1 of the heater layer 14 and the duct formation layer 13 in the width direction W than an expansion T2 of the shielding layer 12 in the width direction W in the gas sensor element 1 as illustrated in FIG. 15.

Figure 16:
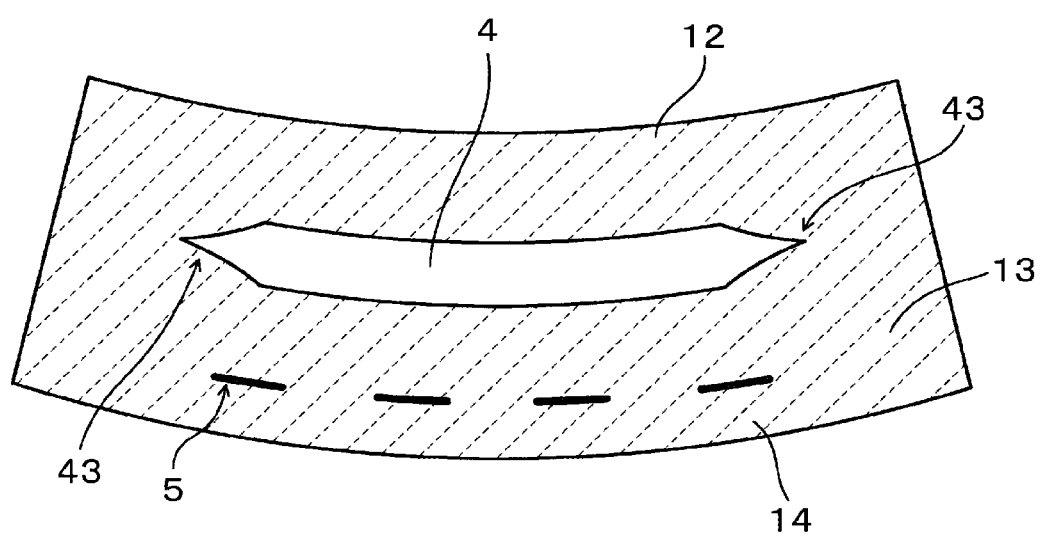
FIG. 16 is a schematic diagram illustrating warpage of the gas sensor element.

As a result, a thermal stress outward in the width direction W occurs also in the vicinity of the tip 433 of each of the projecting corner portions 43 of the chamber 4 at a portion close to the heater 5 as compared with a portion far from the heater 5. The gas sensor element 1 is then warped with a heater layer 14 side protruding as illustrated in FIG. 16. It should be noted that FIG. 15 and FIG. 16 are schematic diagrams with omission of a duct, etc.

Meanwhile, cracking of the ceramic layer beginning at the projecting corner portion 43 is likely to occur with an increase in the tensile stress acting in a direction perpendicular to a projecting direction of the projecting corner portion 43.

Figure 17:
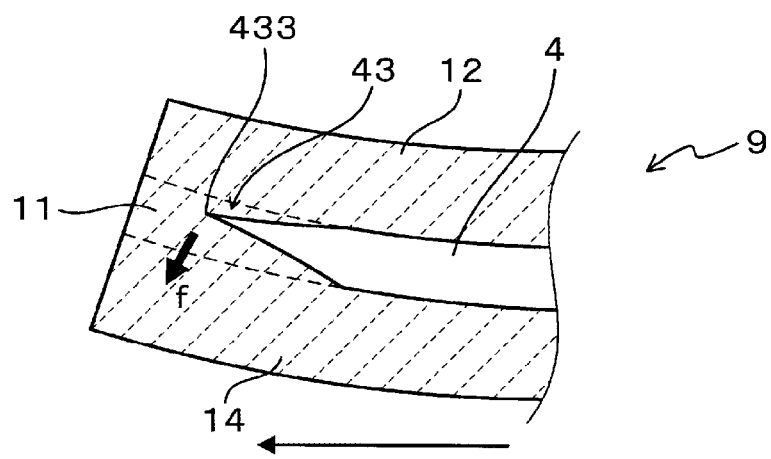
FIG. 17 is an illustration of a tensile stress acting on the vicinity of the projecting corner portion in the gas sensor element of the comparative embodiment.
Figure 18:
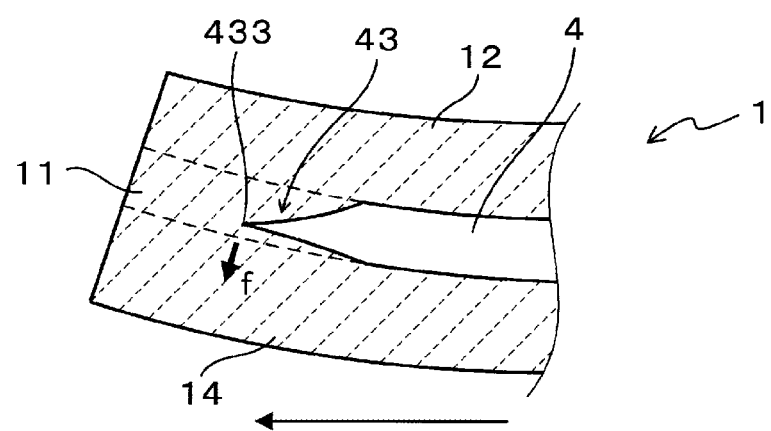
FIG. 18 is an illustration of a tensile stress acting on the vicinity of the projecting corner portion in the gas sensor element of the first embodiment.

Here, a comparison is made between the gas sensor element 9 of the comparative example illustrated in FIG. 17 and the gas sensor element 1 of the present embodiment illustrated in FIG. 18 under a thermal stress. It is then found that the gas sensor element 1 of the present embodiment is likely to have, in the vicinity of each of the projecting corner portions 43, a smaller vector component f of the thermal stress in the direction perpendicular to a projecting direction of the projecting corner portion 43 than the gas sensor element 9 of the comparative embodiment. In other words, the present embodiment allows for reducing a tensile stress f acting on the ceramic layer in the vicinity of the projecting corner portions 43 as compared with the comparative embodiment. Therefore, the present embodiment enables reduction of cracking of the element which starts at the projecting corner portion 43.

On the cross section perpendicular to the longitudinal direction Y, the angle α of at least one of the projecting corner portions 43 is equal to or less than 30°. In a case where the angle α is equal to or less than 30°, cracking beginning at the projecting corner portion 43 is relatively likely to occur unless a formation position of the tip 433 of the projecting corner portion 43 is appropriately set. In other words, a later-described stress intensity factor K increases and extension of a crack is likely to occur. Accordingly, positions of the tips 433 of the projecting corner portions 43 are located closer to the heater 5 than the center 4C of the chamber 4 is as described above, which makes it possible to more effectively prevent cracking of the element.

Figure 19:
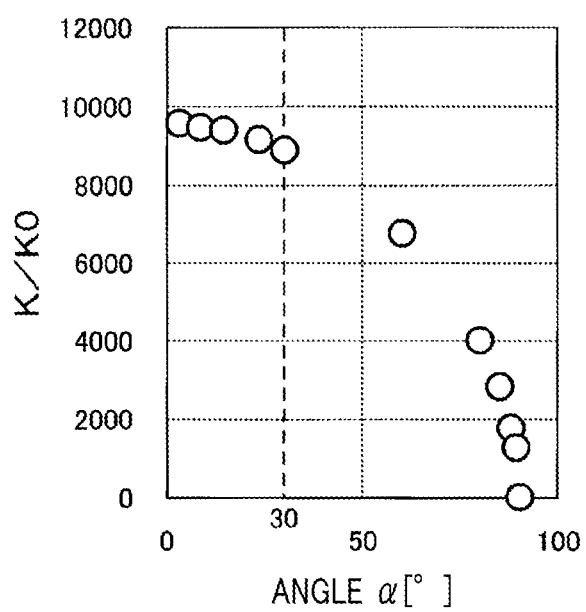
FIG. 19 is a diagram illustrating a relationship between an angle α and a stress intensity factor.

The stress intensity factor K is usually represented by $K=\sigma \times (\pi a)^{1/2}$. Here, 'a' denotes a projection length of the projecting corner portions 43. On the assumption that there is no projecting corner portion 43, 'σ' denotes a stress occurring in the chamber formation layer 11 at a position corresponding to the position of each of the projecting corner portions 43. A relationship between the angle α of the projecting corner portions 43 and the stress intensity factor K is graphed in FIG. 19 on the basis of this expression. In this drawing, an ordinate axis represents a relative ratio (K/K0) of the stress intensity factor K at the angle α to a value of the stress intensity factor K0 at α=90°. As is understandable from this drawing, the stress intensity factor K particularly increases when α≤30°. That is to say, it is found that α≤30° results in a state where extension of cracking is likely to occur, which means cracking of the element is likely to occur.

In addition, the dimension of the chamber 4 in the width direction W is larger than that of the duct 6. This facilitates a reduction in size of the gas sensor element 1 with an electrode reactive area of the measurement electrode 31 ensured. However, the width Wb of the portion of the chamber formation layer 11 outside the chamber 4 is likely to be reduced with an increase in the width Wc of the chamber 4. This makes a temperature of the shielding layer 12 unlikely to rise, so that a temperature variation in the laminating direction Z is likely to occur in the gas sensor element 1. As a result, a thermal stress in the vicinity of the projecting corner portions 43 is likely to become large.

In addition, in a case where the width Wc of the chamber 4 is larger than the width Wd of the duct 6, heat of the heater 5 is easy to transfer to the solid electrolyte body 2 inside in the width direction W with respect to the projecting corner portions 43 of the chamber 4. As a result, the solid electrolyte body 2 is likely to expand inside with respect to the projecting corner portions 43 and the thermal stress in the vicinity of the projecting corner portions 43 is likely to become large.

In the structure where the thermal stress is likely to become large as described above, the above-described prevention of cracking of the element can be effectively achieved by setting the positions of the tips 433 of the projecting corner portions 43 at positions close to the heater 5.

In addition, the projecting corner portions 43 are formed to face the same material on both sides in the laminating direction Z. This makes it possible to reduce cracking of the element of the gas sensor element 1 beginning at the tips 433 of the projecting corner portions 43.

In view of the above, according to the present embodiment, it is possible to provide a gas sensor element capable of being effectively prevented from suffering cracking of the element.

Experimental Example 1

In the present example, gas sensor elements in a variety of shapes were examined in terms of prevention effect of cracking of the element and measurement accuracy as indicated in Table 1.

That is to say, a plurality of gas sensor elements with a variety of changes in dimensions of components, such as the width Wc of the chamber 4, the width Wd of the duct 6, the corner portion height t1, and the center height t2, were prepared as Samples 1 to 10.

TABLE 1

| Sample | Wc/Wd | Wb mm | Wd mm | Wc mm | t1 μm | t2 μm | Acceptable Rate of Temperature Rise ° C./sec | IL Accuracy % |
|---|---|---|---|---|---|---|---|---|
| 1 | 1.31 | 1.0 | 1.3 | 1.7 | 12 | 15 | ≥400 | ±0.5 |
| 2 | 1.31 | 1.0 | 1.3 | 1.7 | 17 | 18 | ≥400 | ±0.5 |
| 3 | 1.31 | 1.0 | 1.3 | 1.7 | 7 | 25 | ≥400 | ±0.5 |
| 4 | 1.31 | 1.0 | 1.3 | 1.7 | 18 | 16 | 250 | ±0.5 |
| 5 | 0.87 | 1.2 | 1.5 | 1.3 | 16 | 18 | ≥400 | ±0.6 |
| 6 | 0.87 | 1.2 | 1.5 | 1.3 | 18 | 16 | 300 | ±0.6 |
| 7 | 0.73 | 1.3 | 1.5 | 1.1 | 12 | 15 | ≥400 | ±0.7 |
| 8 | 2.00 | 0.8 | 1.0 | 2.0 | 12 | 15 | 350 | ±0.4 |
| 9 | 1.73 | 0.9 | 1.1 | 1.9 | 18 | 16 | 200 | ±0.4 |
| 10 | 1.73 | 0.9 | 1.1 | 1.9 | 16 | 18 | ≥400 | ±0.4 |

Then, for evaluation of prevention effect of the cracking of the element, it was examined to what extent a rate of temperature rise could be increased in energizing the heater 5 of each sample to raise a temperature with cracking of the element being prevented. That is to say, with each sample placed in the atmosphere, the heater 5 was energized at a constant applied voltage to raise the temperature. At this time, a center temperature of the heater 5 was raised from room temperature to 950° C. Once the center temperature of the heater 5 reached 950° C., the energization of the heater was stopped and the heater was naturally cooled. This operation was repeated for five times. The center temperature of the heater 5 refers to a maximum temperature point of the heater 5. After performing this durability test, each sample was subject to a staining appearance check to determine whether cracking of the element occurs. The rate of temperature rise was changed in increments of 50° C./sec during the test and evaluation was made on the basis of to what extent the rate of temperature rise could be increased with a state free from cracking of the element kept. The rate of temperature rise was defined as an average rate of temperature rise during a period until the temperature reached 100° C. from room temperature. Table 1 indicates the result. "Acceptable Rate of Temperature Rise" in Table 1 refers to a maximum rate of temperature rise at which no cracking of the element occurred during the present test. As long as the acceptable rate of temperature rise is equal to or more than 300° C./sec, there is no problem with durability.

As is understandable from Table 1, Sample 4 had an acceptable rate of temperature of rise of 250° C./sec. In contrast, Samples 1 to 3, which were the same in Wb, Wc, and Wd as Sample 4, had an acceptable rate of temperature rise of equal to or more than 400° C./sec. This has given the result that none of Samples 1 to 3, which satisfy t1<t2, undergoes cracking of the element under conditions that cracking of the element occurs in Sample 4, in which t>t2. It should be noted that "≥400" entered under the heading of "Acceptable Rate of Temperature Rise" in Table 1 means that at least no cracking occurred beginning at the projecting corner portion 43 at a rate of temperature rise of 400° C./sec during the durability test, although cracking might occur in another portion. It should be noted that "cracking of the element" in the present example refers to cracking of the element beginning at the projecting corner portion 43 unless specified otherwise.

In addition, Sample 9 had an acceptable rate of temperature rise of 200° C./sec, whereas Sample 10, which was the same in Wb, Wc, and Wd as Sample 9, had an acceptable rate of temperature rise of equal to or more than 400° C./sec. This has given the result that Sample 10, which satisfies t1<t2, undergoes no cracking of the element under conditions that cracking of the element occurs in Sample 9, in which t>t2.

These results also support that cracking of the element can be reduced by setting the positions of the tips 433 of the projecting corner portions 43 at positions closer to the heater 5 than the center 4C of the chamber 4 is.

In addition, Sample 5, Sample 7, and Sample 8, which satisfied t1<t2, also had an acceptable rate of temperature rise as high as 350° C./sec or more as well as Sample 4 and Sample 10. This also supports that cracking of the element can be reduced by setting the positions of the tips 433 of the projecting corner portions 43 at positions closer to the heater 5 than the center 4C of the chamber 4 is.

It should be noted that Sample 6 had a relatively high acceptable rate of temperature rise of 300° C./sec, although t1>t2. This is presumed to be because Wc<Wd, which means that the width of the chamber 4 and the width of the duct 6 are in a relationship where cracking of the element is relatively unlikely to occur.

Meanwhile, with Wc/Wd extremely reduced as described above, a decrease in measurement accuracy is of concern. To confirm this point, the above-described samples were also evaluated in terms of measurement accuracy of the gas sensor element. The measurement accuracy was evaluated in accordance with an accuracy (hereinafter, referred to as IL accuracy) of a value of a limiting current detected during measurement of an exhaust gas from a gasoline engine resulting from combustion of a stoichiometric mixture. IL accuracies of Samples 1 to 4 and Samples 8 to 10 are all favorably accuracies within a range of ±0.5%.

In contrast, IL accuracies of Samples 5 to 7 were out of the range of ±0.5%. Samples 5 to 7 were all less than 1 in Wc/Wd and have a relationship of Wc<Wd. It can be said that Samples 5 to 7 are disadvantageous in terms of measurement accuracy, although cracking of the element is relatively unlikely to occur.

It can also be seen from Table 1 that, in particular, Samples 1 to 3 and 10, which satisfy 1<Wc/Wd≤1.73 and satisfy t1<t2, provide a high acceptable rate of temperature rise with a favorable IL accuracy ensured. That is to say, an especially high prevention effect of cracking of the element is achievable with the measurement accuracy ensured.

Second Embodiment

Figure 20:
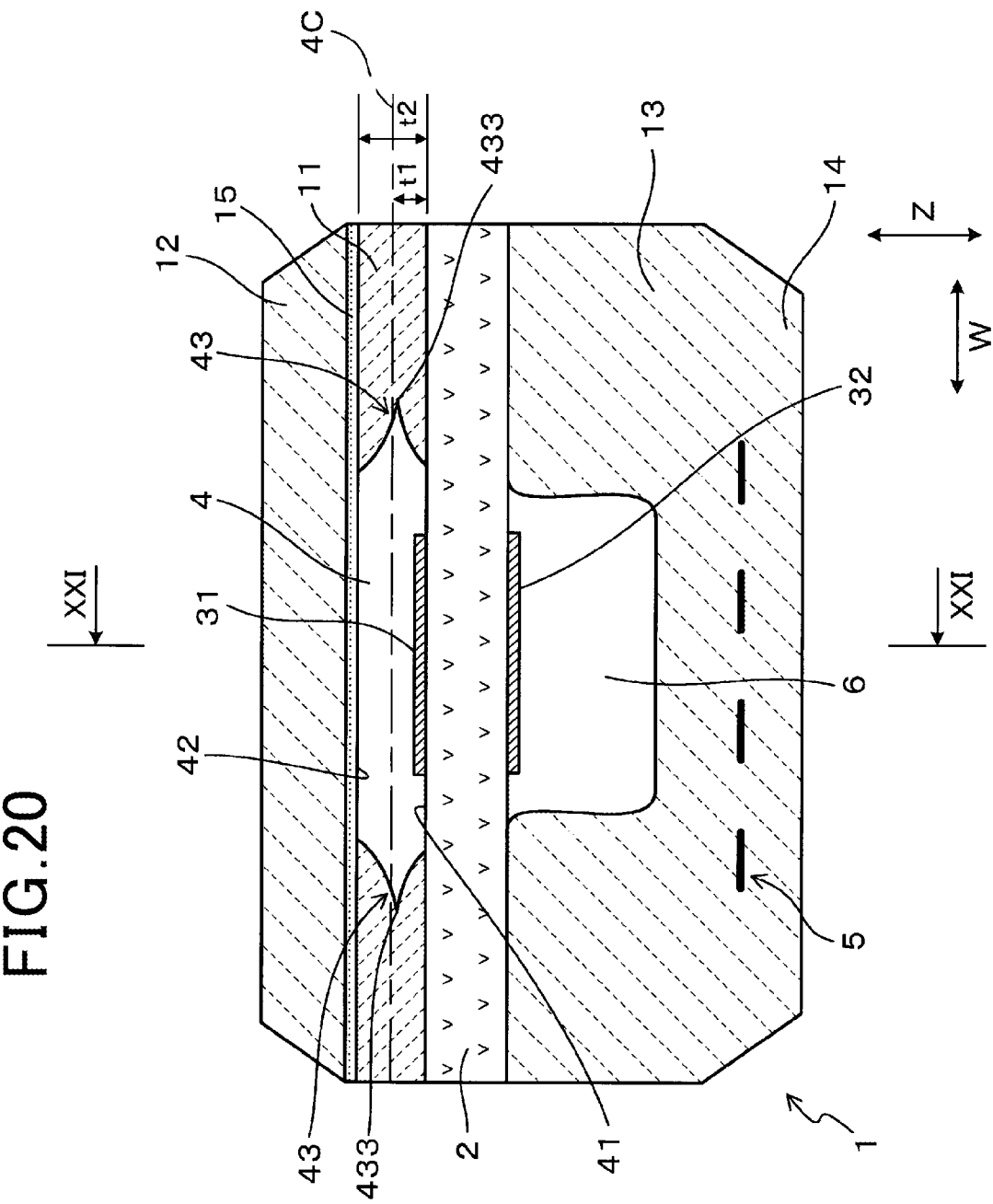
FIG. 20 is a cross-sectional illustration of a gas sensor element according to a second embodiment, that is, a cross-sectional view taken along a line XX-XX in FIG. 21 and seen from the arrow direction.
Figure 21:
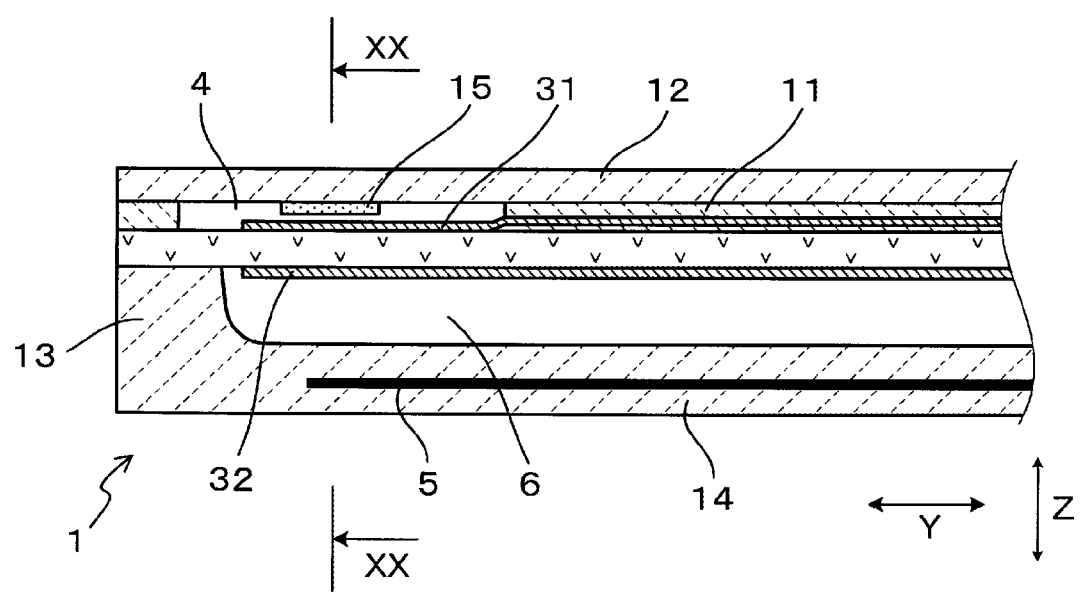
FIG. 21 is a cross-sectional view taken along a line XXI-XXI in FIG. 20 and seen from the arrow direction.
Figure 22:
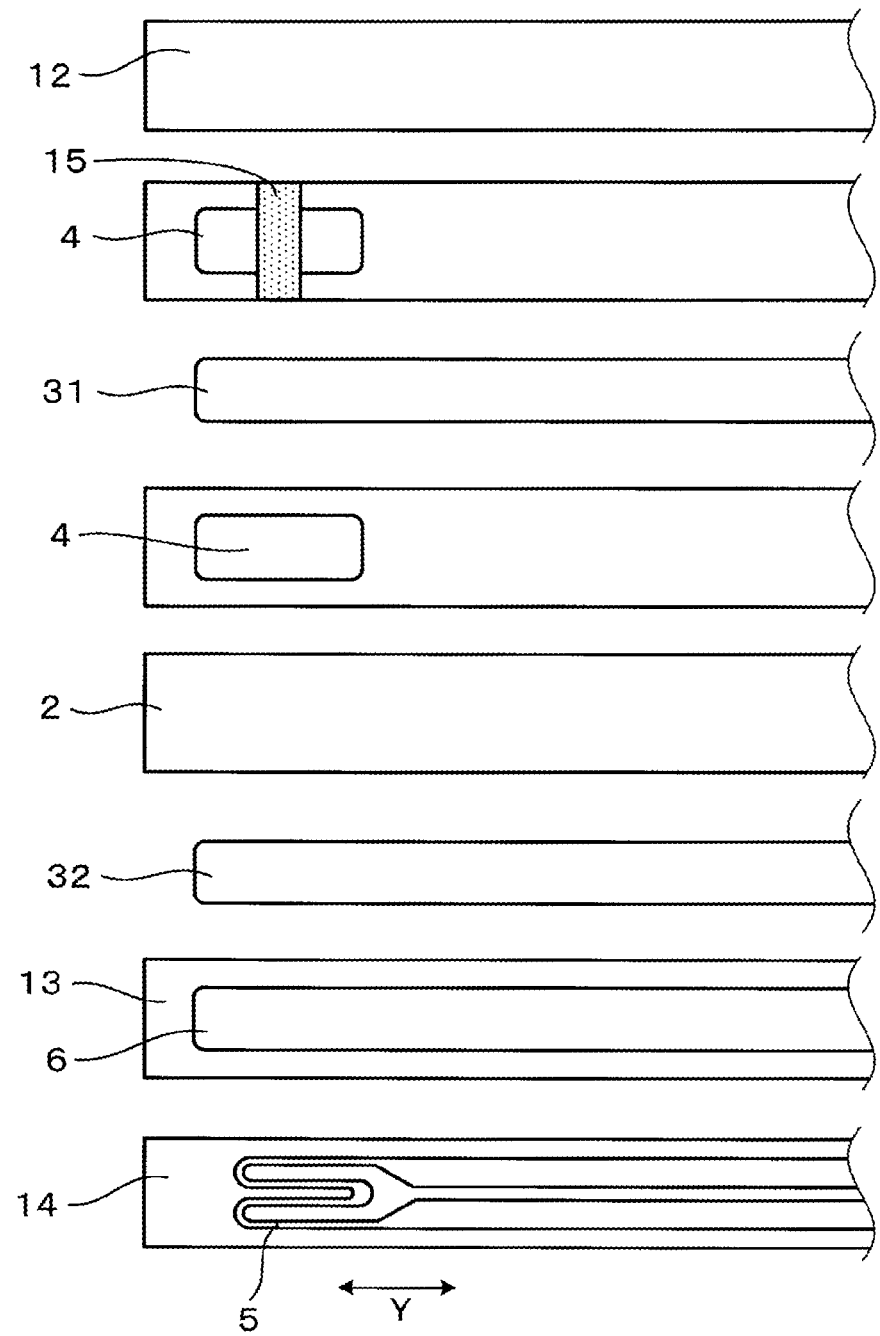
FIG. 22 is a development illustration of the gas sensor element according to the second embodiment.

The present embodiment is an embodiment where portions for the measured gas to enter the chamber 4 are provided on both sides of the chamber 4 in the width direction W as illustrated in FIG. 20 to FIG. 22.

In the present embodiment, the diffusion resistor 15 is provided in the vicinity of a middle portion of the chamber 4 in the longitudinal direction Y as illustrated in FIG. 21 and FIG. 22. Further, a distal end side of the chamber 4 is closed by a part of the chamber formation layer 11. In other words, the chamber 4 is closed on the distal end side thereof so as not to let a gas through.

The diffusion resistor 15 is formed at a part of the chamber 4 in the longitudinal direction Y along the second surface 42 of the chamber 4 as illustrated in FIG. 20 and FIG. 21. Further, the diffusion resistor 15 is formed across the gas sensor element 1 in the width direction W as illustrated in FIG. 20 and FIG. 22. It should be noted that a cross section of the gas sensor element 1 at a position where the diffusion resistor 15 is disposed is seen in a shape as illustrated in FIG. 20.

In contrast, a cross section of the gas sensor element 1 at a position where no diffusion resistor 15 is provided is similar to the cross section of the gas sensor element 1 of the first embodiment illustrated in FIG. 1.

Except for the above, the present embodiment is similar to the first embodiment. It should be noted that among the reference signs used in the second embodiment and subsequent embodiments, the same reference signs as those used in the previous embodiment refer to components or the like similar to those in the previous embodiment unless specified otherwise.

The present embodiment also achieves workings and effects similar to those of the first embodiment.

Third Embodiment

The present embodiment is an embodiment providing variations in a structure of a ceramic layer of the solid electrolyte body 2 which is on a side close to the heater 5 as illustrated in FIG. 23 to FIG. 27. It should be noted that the measurement electrode and the reference electrode are omitted in FIG. 23 to FIG. 27. The same applies to FIG. 28 to FIG. 35.

Figure 23:
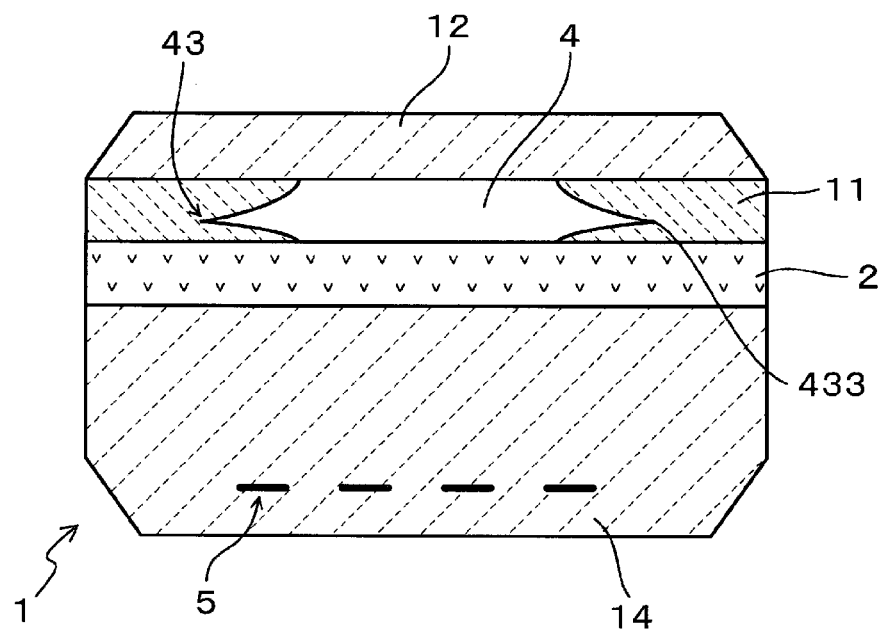
FIG. 23 is a cross-sectional illustration of a gas sensor element according to a third embodiment provided with no duct.

The gas sensor element 1 illustrated in FIG. 23 is provided with no duct.

Figure 24:
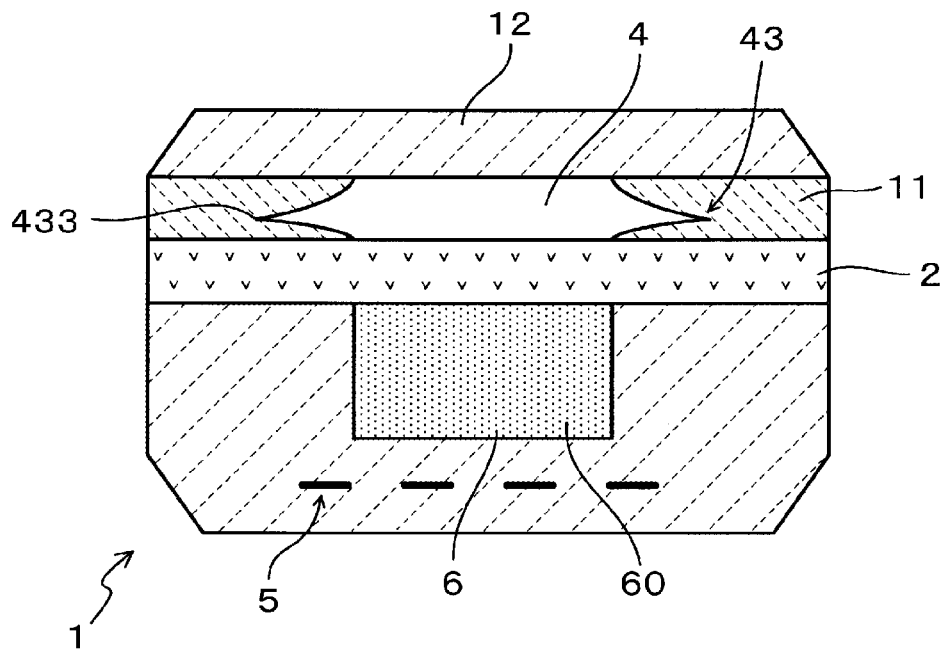
FIG. 24 is a cross-sectional illustration of a gas sensor element according to the third embodiment including a duct filled with a porous body.

The gas sensor element 1 illustrated in FIG. 24 includes the duct 6 filled with a porous body 60. The porous body 60 has a function to adsorb and remove a poisoning substance entering the duct 6 from an atmosphere side.

Figure 25:
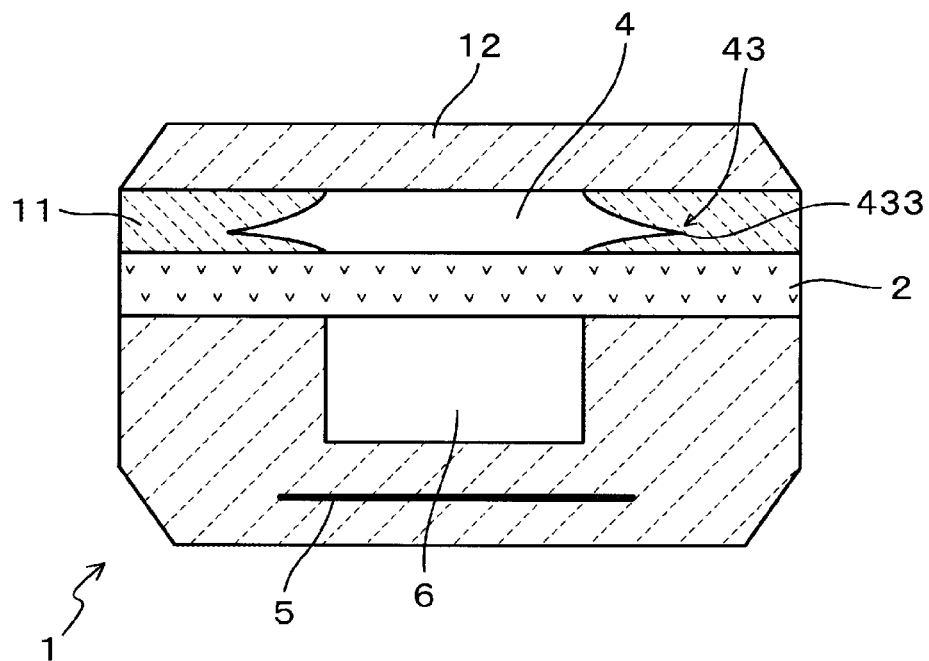
FIG. 25 is a cross-sectional illustration a gas sensor element according to the third embodiment including a heater in a planar form.

The gas sensor element 1 illustrated in FIG. 25 includes the heater 5 located in a planar shape.

Figure 26:
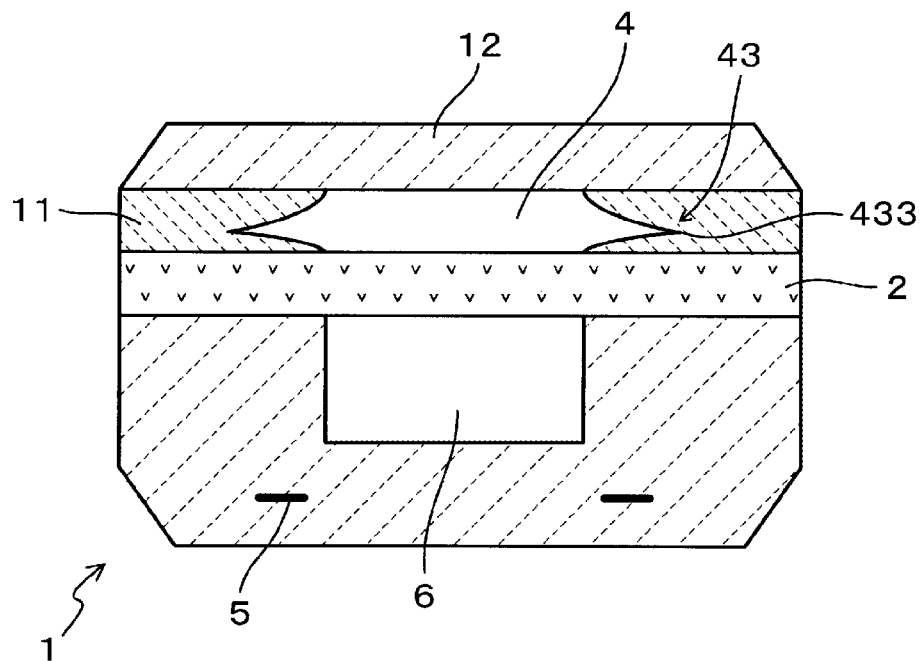
FIG. 26 is a cross-sectional illustration of a gas sensor element according to the third embodiment in which a location of the heater is changed.

The gas sensor element 1 illustrated in FIG. 26 includes the heater 5 located outside in the width direction with respect to the duct 6. In other words, the heater 5 is formed at a position not overlapping the duct 6 in the laminating direction Z.

Figure 27:
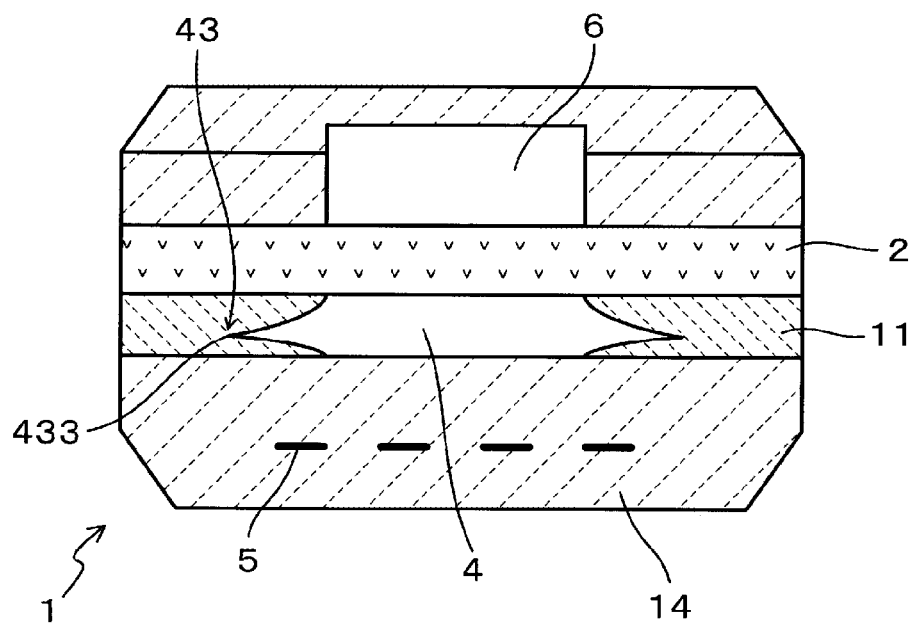
FIG. 27 is a cross-sectional illustration of a gas sensor element according to the third embodiment in which a position of a chamber is changed.

The gas sensor element 1 illustrated in FIG. 27 includes the chamber 4 formed at a position between the heater 5 and the duct 6.

In the gas sensor elements as illustrated in FIG. 23 to FIG. 27, it is likewise possible to reduce cracking of the element by virtue of the tips 433 of the projecting corner portions 43 of the chamber 4 being provided at positions close to the heater 5 in the laminating direction Z as in the first embodiment.

In addition to the above, configurations and workings and effects as in the first embodiment are achievable.

Fourth Embodiment

In addition, the shape and structure of the chamber 4 are also changeable in a variety of manners, for example, as illustrated in FIG. 28 to FIG. 31. It should be noted that a part of components of the gas sensor element 1 (for example, the duct formation layer 13 and/or the heater layer 14) is omitted in FIG. 28 to FIG. 31. The same applies to later-described FIG. 33 to FIG. 35.

Figure 28:
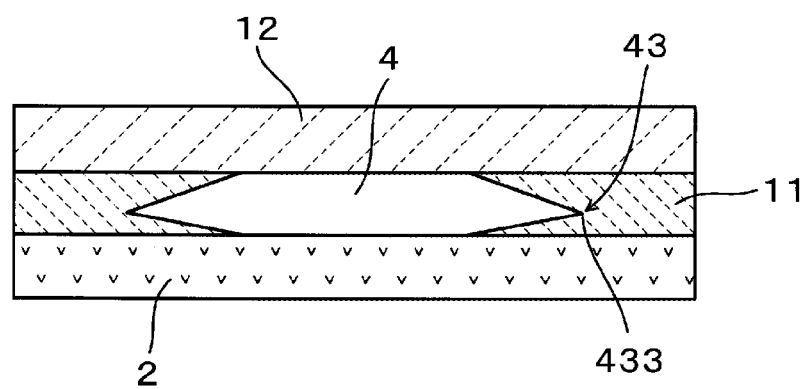
FIG. 28 is a cross-sectional illustration of a chamber according to a fourth embodiment including a chamber formation layer having an internal surface substantially in the form of a flattened surface.

As illustrated in FIG. 28, an internal surface of the chamber formation layer 11, which forms the projecting corner portions 43, may be substantially in the form of a flat surface.

Figure 29:
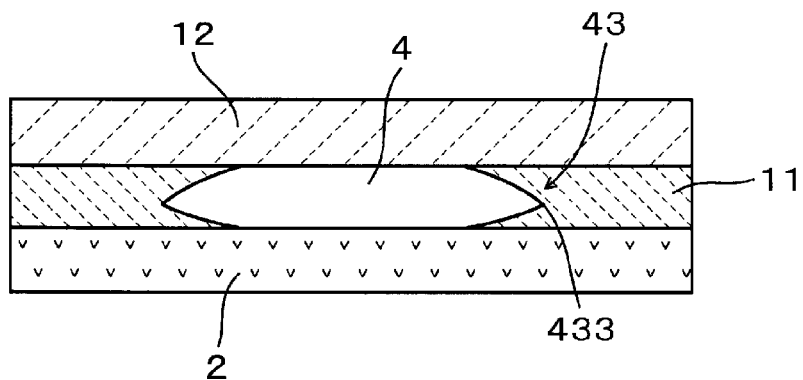
FIG. 29 is a cross-sectional illustration of a chamber according to the fourth embodiment including a chamber formation layer having an internal surface in a recessed curve surface.

As illustrated in FIG. 29, the internal surface of the chamber formation layer 11, which forms the projecting corner portions 43, may also be in the form of a concave surface.

Figure 30:
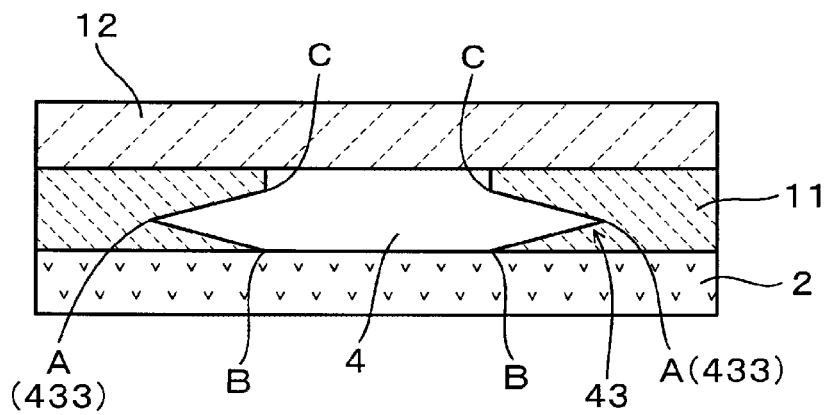
FIG. 30 is a cross-sectional illustration of a chamber according to the fourth embodiment including a chamber formation layer having a corner portion in addition to a tip.
Figure 31:
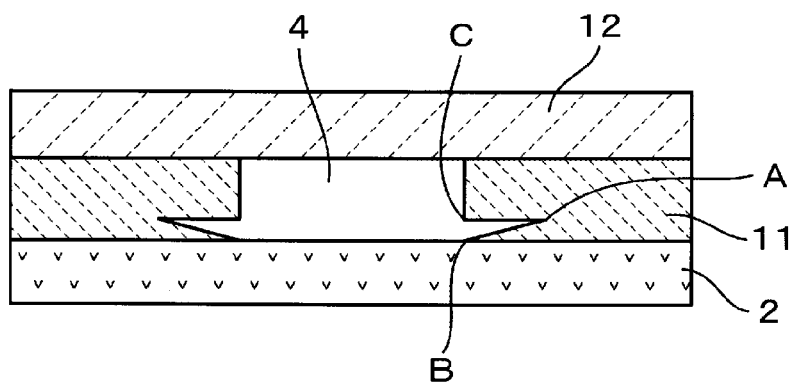
FIG. 31 is a cross-sectional illustration of another chamber according to the fourth embodiment including a chamber formation layer having a corner portion in addition to a tip.

As illustrated in FIG. 30 and FIG. 31, the internal surface of the chamber formation layer 11 may have a corner portion in addition to the tips 433 of the projecting corner portions 43. In this case, the angle α of each of the projecting corner portions 43 may be defined by angel BAC, where a point A represents the tip 433 of the projecting corner portion 43 and a point B and a point C represent tips of corner portions adjacent on both sides in the laminating direction Z, respectively. In other words, the angle α may be defined on the assumption that the tips of the corner portions adjacent to the tip 433 on both sides in the laminating direction Z correspond to the above-described point B and point C illustrated in FIG. 5, respectively.

Fifth Embodiment

Figure 32:
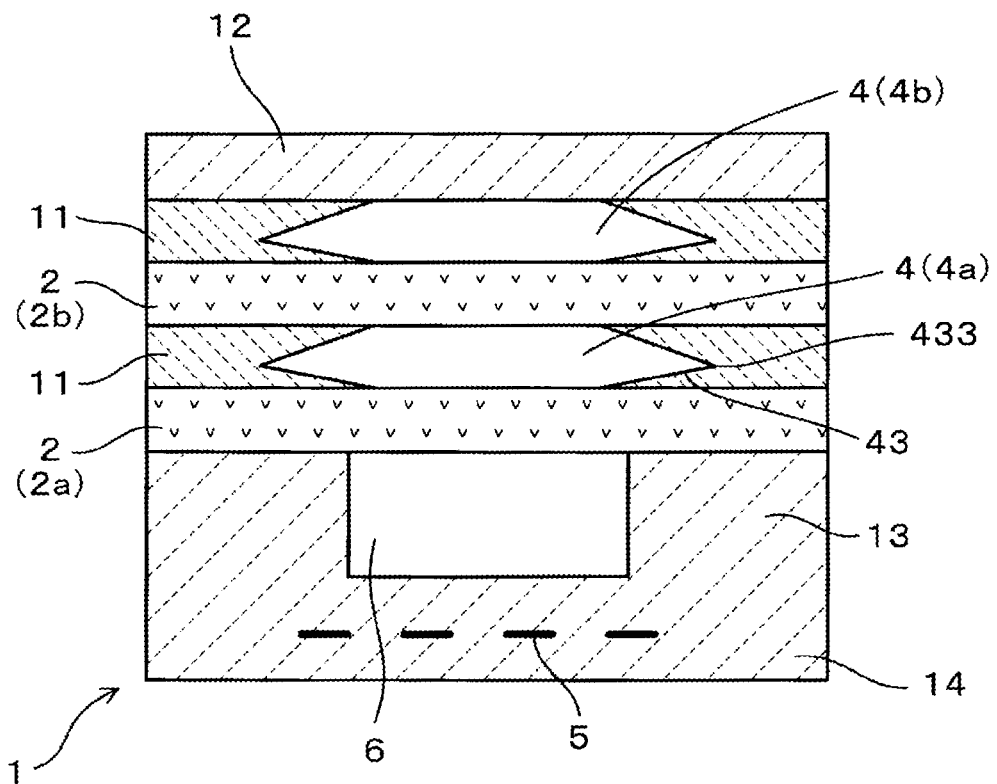
FIG. 32 is a cross-sectional illustration of a gas sensor element according to a fifth embodiment.

The present embodiment is an embodiment of the gas sensor element 1 including a plurality of cambers 4 located in the laminating direction Z as illustrated in FIG. 32.

In addition, two layers of the solid electrolyte body 2 are provided in the present embodiment. Further, the respective chamber formation layers 11 are laminated on surfaces of solid electrolyte bodies 2a and 2b opposite the heater 5. These chamber formation layers 11 form the respective chambers 4 (4a and 4b).

In such a configuration, the tips 433 of the projecting corner portions 43 of at least one of the plurality of chambers 4 are located at positions closer to the heater 5 than the center 4C of the chamber 4 is. Preferably, the tips 433 of the projecting corner portions 43 of the chamber 4a, which is on a side close to the heater 5, are located at positions closer to the heater 5 than the center 4C of the chamber 4 is. More preferably, the tips 433 of the projecting corner portions 43 of each of the plurality of chambers 4 are located at positions closer to the heater 5 than the center 4C of the chamber 4 is.

The gas sensor element 1 of the present embodiment is favorably usable, for example, as a NOx sensor element that detects a concentration of a nitrogen oxide. In this case, a pump cell is provided in the solid electrolyte body 2a, which is on the side close to the heater 5, and a sensor cell is provided in the solid electrolyte body 2b, which is on the side far from the heater 5. The measured gas (for example, an exhaust gas) is introduced into the chamber 4a and the reference gas (for example, the atmosphere) is introduced into the chamber 4b. Oxygen within the chamber 4a is pumped into the duct 6 by the pump cell and the concentration of NOx (nitrogen oxide) in the measured gas is measured by the sensor cell.

Except for the above, the present embodiment is similar to the first embodiment. The present embodiment can also achieve workings and effects similar to those of the first embodiment.

Sixth Embodiment

Figure 33:
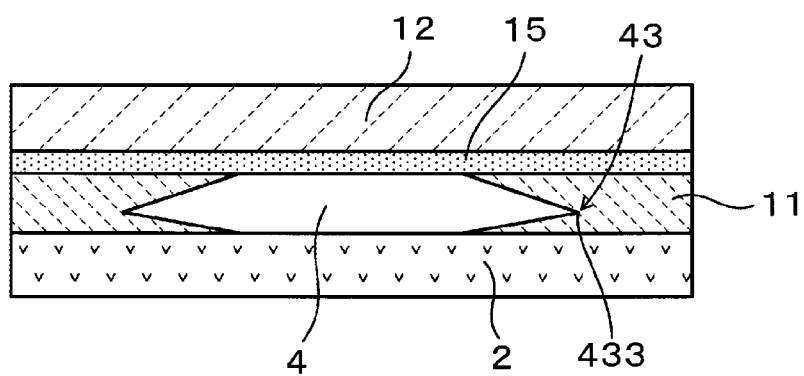
FIG. 33 is a cross-sectional illustration of a part of a gas sensor element according to a sixth embodiment.
Figure 34:
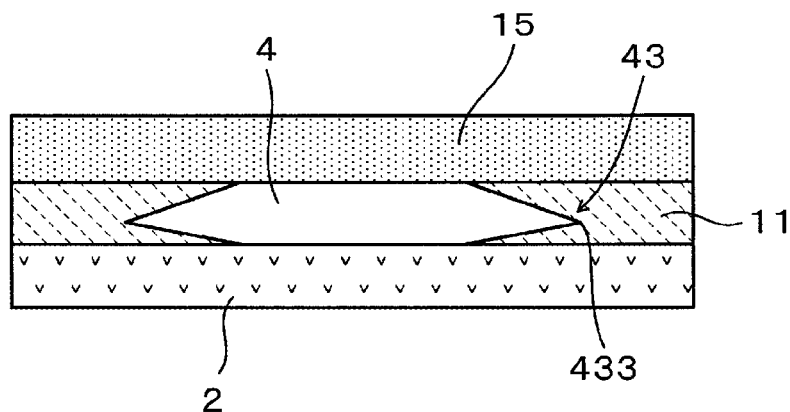
FIG. 34 is a cross-sectional illustration of a part of another gas sensor element according to the sixth embodiment.
Figure 35:
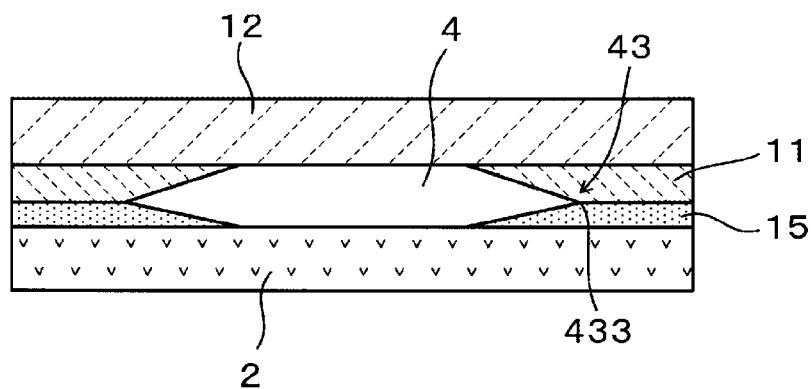
FIG. 35 is a cross-sectional illustration of apart of still another gas sensor element according to the sixth embodiment.

The present embodiment is a modification embodiment of the second embodiment described above, that is, an embodiment where a formation position of the diffusion resistor 15 is changed in a variety of manners as illustrated in FIG. 33 to FIG. 35.

As illustrated in FIG. 33, the diffusion resistor 15 may be interposed between the chamber formation layer 11 and the shielding layer 12. In this case, the diffusion resistor 15 may form the second surface 42 of the chamber 4. In addition, the diffusion resistor 15 may be formed across the entire chamber 4 in the longitudinal direction Y. Alternatively, only a part of the chamber 4 in the longitudinal direction Y may be provided with the diffusion resistor 15 as in the second embodiment (see FIG. 21 and FIG. 22).

In addition, as illustrated in FIG. 34, with no shielding layer 12 provided, the diffusion resistor 15 may be provided such that it covers the chamber 4 from the opposite side to the solid electrolyte body 2.

In addition, as illustrated in FIG. 35, the diffusion resistor 15 may be provided adjacent to an exterior of the chamber 4 in the width direction W. In addition, in such a case, the tips 433 of the projecting corner portions 43 may be located in an interface between the diffusion resistor 15 and the chamber formation layer 11.

Except for the above, the present embodiment is similar to the first embodiment. The present embodiment can also achieve workings and effects similar to those of the first embodiment.

Seventh Embodiment

Figure 36:
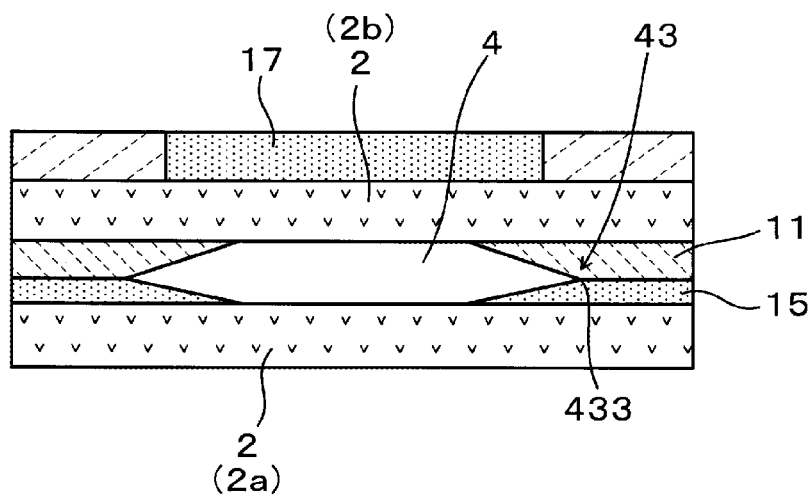
FIG. 36 is a cross-sectional illustration of a part of a gas sensor element according to a seventh embodiment.

The present embodiment is an embodiment of the gas sensor element 1 with a two-cell structure where the chamber 4 is provided between two solid electrolyte bodies 2 as illustrated in FIG. 36.

A reference cell is provided in the solid electrolyte body 2a, which is on the side close to the heater 5, and a pump cell is provided in the solid electrolyte body 2b, which is on the side far from the heater 5. An opposite side of the pump cell to the chamber 4 is exposed on a device surface through a porous layer 17. A part of the chamber formation layer 11 is provided with the diffusion resistor 15. In addition, no particular space is provided on an opposite side of the reference cell to the chamber 4. In other words, no duct is formed in the present embodiment.

In the gas sensor element 1 having such a configuration, a voltage is applied between electrodes of the pump cell so that an oxygen concentration within the chamber 4 is maintained at a predetermined value by the pump cell. In the reference cell, an electromotive force corresponding to the oxygen concentration within the chamber 4 arises. In the gas sensor element 1 of the present embodiment, the pump cell is activated to cause a constant electromotive force to arise in the reference cell. At this time, the oxygen concentration in the measured gas is measured on the basis of a value of an electric current flowing through the pump cell.

Likewise, in the gas sensor element 1 as described above, the tips 433 of the projecting corner portions 43 of the chamber 4 are located on the side closer to the heater 5 than the center 4C of the chamber 4 in the laminating direction Z is.

Except for the above, the present embodiment is similar to the first embodiment. The present embodiment can also achieve workings and effects similar to those of the first embodiment.

The present disclosure is not limited to the above-described embodiments and is applicable to a variety of embodiments without departing from the scope thereof.

The present disclosure is described in conformity with the embodiments; however, it should be understood that the present disclosure is not limited to the embodiments and structures. The present disclosure embraces various modifications examples and modifications within the range of equivalency. Additionally, various combinations and forms and, further, other combinations and forms including only a single element or more or less in addition thereto are also within the scope and the spirit of the present disclosure.

What is claimed is:

1. A gas sensor element, which is a laminated gas sensor element provided by laminating a plurality of ceramic layers, the gas sensor element comprising:
    a solid electrolyte body having an oxygen ion conductivity;
    a measurement electrode provided on a first principal surface of the solid electrolyte body;
    a reference electrode provided on a second principal surface of the solid electrolyte body;
    a chamber facing the measurement electrode and into which a measured gas is to be introduced; and
    a heater configured to heat the solid electrolyte body, wherein
    the chamber comprises at least one projecting corner portion, the at least one projecting corner portion projecting, on a cross section perpendicular to a longitudinal direction of the gas sensor element, in a width direction perpendicular to both of the longitudinal direction and a laminating direction,
    a tip of the at least one projecting corner portion is disposed on a side closer to the heater than a center of the chamber in the laminating direction is,
    the at least one projecting corner portion is formed by two protruding curve surfaces, one of the two protruding curve surfaces is a curve surface from the tip of the at least one projecting corner portion to a first surface of the chamber on the cross section perpendicular to the longitudinal direction, and an other of the two protruding curve surfaces is a second curve surface from the tip of the at least one projecting corner portion to a second surface of the chamber on the cross section perpendicular to the longitudinal direction,
    the gas sensor element comprises a duct facing the reference electrode and into which a reference gas is to be introduced,
    the heater is provided on an opposite side to the solid electrolyte body with the duct in between in the laminating direction,
    the chamber has a larger dimension in the width direction than the duct, and
    a width Wc of the chamber and a width Wd of the duct satisfy $1 < Wc/Wd \leq 1.73$.

2. The gas sensor element according to claim 1, wherein the at least one projecting corner portion comprises a plurality of projecting portions, at least one of the plurality of projecting portions has an angle equal to or less than 30°, on the cross section perpendicular to the longitudinal direction.

3. The gas sensor element according to claim 1, wherein the at least one projecting corner portion is formed to face a same material on both sides in the laminating direction.

4. The gas sensor element according to claim 2, wherein the at least one projecting corner portion is formed to face a same material on both sides in the laminating direction.

5. The gas sensor element according to claim 1, wherein the at least one projecting corner portion comprises a plurality of projecting portions, each of the plurality of projecting portions has an angle equal to or less than 30°, on the cross section perpendicular to the longitudinal direction.

6. The gas sensor element according to claim 1, wherein
    the at least one projecting corner portion comprises a plurality of projecting portions, each of the plurality of projecting portions has an angle equal to or less than 30°, on the cross section perpendicular to the longitudinal direction;
    each of the plurality of projecting portions is respectively formed by two protruding curve surfaces, one of the two protruding curve surfaces is a curve surface from the tip of the projecting corner portion to the a first surface of the chamber on the cross section perpendicular to the longitudinal direction, and an other of the two protruding curve surfaces is a second curve surface from the tip of the projecting corner portion to the second surface of the chamber on the cross section perpendicular to the longitudinal direction; and
    each of the respective tips of the projecting corner portions is disposed on a side closer to the heater than the center of the chamber in the laminating direction.

7. The gas sensor element according to claim 1, wherein the gas sensor element has a measurement accuracy of the measured gas within a range of ±0.5%.

* * * * *